United States Patent
Takahashi et al.

(10) Patent No.: US 12,352,344 B2
(45) Date of Patent: Jul. 8, 2025

(54) TRANSMISSION STRUCTURE

(71) Applicant: KANZAKI KOKYUKOKI MFG. CO., LTD., Amagasaki (JP)

(72) Inventors: Takumi Takahashi, Amagasaki (JP); Kohei Ogura, Amagasaki (JP); Fumiaki Ito, Amagasaki (JP); Tasuku Inoue, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/592,621

(22) Filed: Mar. 1, 2024

(65) Prior Publication Data
US 2024/0328495 A1 Oct. 3, 2024

(30) Foreign Application Priority Data
Mar. 30, 2023 (JP) ................. 2023-054721

(51) Int. Cl.
*F16H 47/04* (2006.01)
*F16H 61/04* (2006.01)
*F16H 61/462* (2010.01)

(52) U.S. Cl.
CPC ......... *F16H 47/04* (2013.01); *F16H 61/0403* (2013.01); *F16H 61/462* (2013.01)

(58) Field of Classification Search
CPC .. F16H 47/04; F16H 61/0403; F16H 61/0437; F16H 61/462; F16H 61/472; F16H 61/47; F16H 61/431; F16H 61/40
See application file for complete search history.

(56) References Cited

U.S. PATENT DOCUMENTS

| 5,890,468 A * | 4/1999 | Ozawa | F02B 33/32 |
| | | | 123/561 |
| 11,293,528 B2 | 4/2022 | Iwaki et al. | |
| 2023/0014393 A1* | 1/2023 | Owada | F16H 61/47 |

* cited by examiner

Primary Examiner — Timothy Hannon
(74) Attorney, Agent, or Firm — CANTOR COLBURN LLP

(57) ABSTRACT

The problem is in providing a transmission structure which includes low gear and high gear transmission mechanisms and an HST and can improve the vehicle speed responsiveness at the time of switching between a low gear transmission state and a high gear transmission state. Solution: At the time of switching between low gear and high gear transmission states, the present invention creates an idling state in which the power transmission state from a drive source to a drive wheel is cut off, and calculates an excess vehicle speed HST gear ratio by adding an excess correction value, which is for changing the vehicle speed at the switching completion point in time in excess of the actual vehicle speed by a predetermined speed, to an actual vehicle speed ratio, which represents an HST gear ratio that causes the vehicle speed at the switching completion point in time to match the actual vehicle speed attained immediately before the completion of the switching, so as to operate an HST actuator using the excess vehicle speed HST gear ratio as a control target value during the idling state.

15 Claims, 10 Drawing Sheets

TRANSMISSION STRUCTURE

CROSS REFERENCE TO RELATED APPLICATIONS

The present invention claims priority under 35 U.S.C. § 119 to Japanese Application, 2023-054721, filed on Mar. 30, 2023, the entire contents of which being incorporated herein by reference.

TECHNICAL FIELD

The present invention relates to a transmission structure interposed in a transmission path from a drive source to a drive wheel.

BACKGROUND ART

There has been a suggestion of a transmission structure (see Patent Document 1 below) configured with: multi-speed speed change structure that are capable of operatively transmitting the rotational power of an input shaft, which is operatively coupled with a drive source, to a travel output shaft, which is operatively coupled with a drive wheel, at predetermined low gear shift and high gear shift, respectively; a low gear clutch mechanism and a high gear clutch mechanism that engage and disengage the power transmission of the low gear and high gear transmission mechanisms; a clutch actuator that switches the operation states of the low gear clutch mechanism and the high gear clutch mechanism; a Hydro Static Transmission (HST) that operates in a cooperative manner with the low gear and high gear clutch mechanisms and is capable of continuously-variable gear shift of the rotational power in each of a low gear transmission state and a high gear transmission state which are created by the low gear clutch mechanism and the high gear clutch mechanism; an HST actuator that operates an output adjusting member of the HST; a gear shift operation member; a vehicle speed sensor that directly or indirectly detects the vehicle speed; an HST sensor that directly or indirectly detects the output rotation speed of the HST; and a control device that operatively controls the clutch actuator and the HST actuator, wherein the control device operates the HST actuator in accordance with the operating position of the gear shift operation member while operating the clutch actuator so that the low gear transmission state is created when the vehicle speed is within a predetermined low gear range, and operates the HST actuator in accordance with the operating position of the gear shift operation member while operating the clutch actuator so that the high gear transmission state is created when the vehicle speed is within a high gear range.

Further, there has been a suggestion that the operation control of the HST actuator is performed in consideration of the traveling load applied to the travel output shaft in the transmission structure configured as described in Patent Document 1.

In this case, the control device is configured to perform the operation control of the HST actuator (hereinafter referred to as the HST load control) using, as a control target value, an HST gear ratio obtained by adding a load correction value corresponding to the traveling load applied to the travel output shaft to a reference HST gear ratio corresponding to the operating position of the gear shift operation member.

The HST load control is useful in the aspect that, even in a case where a large traveling load occurs in the low gear transmission state or the high gear transmission state, the rotation speed (that is, the vehicle speed) created in the travel output shaft can be matched with or approximated to the rotation speed corresponding to the operating position of the gear shift operation member.

However, in the conventional transmission structure provided with the HST load control, even if the HST load control is performed in one of the low gear transmission state and the high gear transmission state (for example, in the low gear transmission state), when a gear switch from one transmission state to the other transmission state (for example, to the high gear transmission state) is executed, the HST load control is canceled, and the operation control of the HST actuator is performed using, as the control target value, the reference HST gear ratio corresponding to the operating position of the gear shift operation member.

Therefore, there has been a problem that, if a gear switch from one of the low gear transmission state and the high gear transmission state (for example, from the low gear transmission state) to the other transmission state (for example, to the high gear transmission state) is executed in a state where a traveling load is applied, the responsiveness to achieve the vehicle speed intended by the operator with an operation on the gear shift operation member is deteriorated.

PRIOR ART DOCUMENT

Patent Document

Patent Document 1: U.S. Pat. No. 11,293,528

SUMMARY OF INVENTION

Technical Problem

The present invention has been made in view of the conventional technology, and aims to provide a transmission structure which includes low gear and high gear transmission mechanisms that create low gear and high gear transmission states and a Hydro Static Transmission (HST) that operates in a cooperative manner with the transmission mechanisms, and can improve the vehicle speed responsiveness at the time of switching between the low gear transmission state and the high gear transmission state.

Solution to Problem

To achieve the above-described goal, the first mode of the present invention provides a transmission structure including: a low gear transmission mechanism that is capable of operatively transmitting a rotational power of a drive shaft, which is operatively coupled with a drive source, to a travel output shaft, which is operatively coupled with a drive wheel, at a predetermined low gear ratio; a high gear transmission mechanism that operatively transmits the rotational power of the drive shaft to the travel output shaft at a high gear ratio for attaining a higher speed than at the low gear ratio; a low gear clutch mechanism and a high gear clutch mechanism that engage and disengage power transmission of the low gear transmission mechanism and the high gear transmission mechanism, respectively; a clutch actuator that switches operation states of the low gear clutch mechanism and the high gear clutch mechanism; a Hydro Static Transmission (HST) that is capable of performing a continuously-variable gear shift of the rotational power in each of a low gear transmission state and a high gear transmission state which are created by the low gear transmission mechanism and the high gear transmission mechanism; an HST actuator that operates an output adjusting member of the HST; a gear shift operation member; a vehicle speed sensor that directly or indirectly detects a vehicle speed; an HST sensor that directly or indirectly detects an output rotation speed of the HST; and a control device that has HST control data, which is for obtaining an HST gear ratio corresponding to an operating position of the gear shift operation member and includes low gear HST control data used in the low gear transmission state and high gear HST control data used in the high gear transmission state, wherein the control device operates the HST actuator using, as a control target value, a reference HST gear ratio that is obtained by applying the operating position of the gear shift operation member to the low gear HST control data, while operating the clutch actuator so that the low gear transmission state is created when the vehicle speed is within a predetermined low gear range, operates the HST actuator using, as the control target value, a reference HST gear ratio that is obtained by applying an operating position of the gear shift operation member to the high gear HST control data, while operating the clutch actuator so that the high gear transmission state is created when the vehicle speed is within a predetermined high gear range which is higher than the low gear range, operates the clutch actuator so that an idling state in which both of the low gear and high gear clutch mechanisms are in a disengaged state is created in a period from a start to a completion of a switching operation between the low gear transmission state and the high gear transmission state, and calculates an excess vehicle speed gear ratio by adding an excess correction value, which causes the vehicle speed at a point in time where the switching operation is completed to be changed in excess of an actual vehicle speed by a predetermined speed, to an actual vehicle speed gear ratio, which represents an HST gear ratio that causes the vehicle speed at the point in time where the switching operation is completed to match the actual vehicle speed that is attained immediately before the switching operation is completed, so as to operate the HST actuator using the excess vehicle speed gear ratio as the control target value in the idling state.

In the first form of the first mode, the control device adds a load correction value corresponding to a traveling load to the reference HST gear ratio at the time of calculating the control target value of the HST actuator, and stores the load correction value at the point in time where the gear switching operation is started as a carry-over load correction value, so as to use the carry-over load correction value as the excess correction value.

In the first form, preferably, the control device uses the carry-over load correction value as the excess correction value only in a case where the load correction value at the point in time where the gear switching operation is started exceeds a predetermined value.

In the first form, preferably, after the gear switching operation is completed, at the time of calculating the control target value of the HST actuator in the transmission state after the gear switching, the control device adds the carry-over load correction value to the reference HST gear ratio while reducing the carry-over load correction value according to the passage of time.

In the second form of the first mode, as the excess correction value, the control device uses a shift-up excess correction value, which is stored in advance and used for a shift-up from the low gear transmission state to the high gear transmission state, and a shift-down excess correction value, which is stored in advance and used for a shift-down from the high gear transmission state to the low gear transmission state.

In the third form of the first mode, at the time of the gear switching between the low gear transmission state and the high gear transmission state, the control device calculates, based on an HST acceleration rate immediately before the switching operation is started and a time period of the idling state, a virtual vehicle speed to be attained at the point in time where the gear switching operation is completed on an assumption that the transmission state before the gear switching had continued during the idling state, and uses, as the excess correction value, an absolute value of a difference between a virtual vehicle speed gear ratio for creating the virtual speed and the actual vehicle speed gear ratio for creating the actual vehicle speed that is attained immediately before the gear switching operation is completed.

In various configurations of the first mode, of the low gear and the high gear clutch mechanisms, at least the clutch mechanism to be in an engaged state after the gear switching is a friction-plate-type which includes a driving-side friction plate and a following-side friction plate, and the control device operates the clutch actuator so that, when the clutch mechanism to be in an engaged state after the gear switching is shifted from a disengaged state to the engaged state, the driving-side friction plate and the following-side friction plate frictionally engage with each other in a sliding manner.

To achieve the above-described goal, the second mode of the present invention provides a transmission structure including: a low gear transmission mechanism that is capable of operatively transmitting a rotational power of a drive shaft, which is operatively coupled with a drive source, to a travel output shaft, which is operatively coupled with a drive wheel, at a that operatively transmits the rotational power of the drive shaft to the travel output shaft at a high gear ratio for attaining a higher speed than at the low gear ratio; a low gear clutch mechanism and a high gear clutch mechanism that engage and disengage power transmission of the low gear transmission mechanism and the high gear transmission mechanism, respectively; a clutch actuator that switches operation states of the low gear clutch mechanism and the high gear clutch mechanism; a Hydro Static Transmission (HST) that is capable of performing a continuously-variable gear shift of the rotational power in each of a low gear transmission state and a high gear transmission state which are created by the low gear transmission mechanism and the high gear transmission mechanism; an HST actuator that operates an output adjusting member of the HST; a gear shift operation member; a vehicle speed sensor that directly or indirectly detects a vehicle speed; an HST sensor that directly or indirectly detects an output rotation speed of the HST; and a control device that has HST control data, which is for obtaining a gear ratio of the HST corresponding to an operating position of the gear shift operation member and includes low gear HST control data used in the low gear transmission state and high gear HST control data used in the high gear transmission state, wherein the control device operates the HST actuator using, as a control target value, a reference HST gear ratio that is obtained by applying the operating position of the gear shift operation member to the low gear HST control data, while operating the clutch actuator so that the low gear transmission state is created when the vehicle speed is within a predetermined low gear range, operates the HST actuator using, as the control target value, a reference HST gear ratio that is obtained by applying an operating position of the gear shift operation member to the high gear HST control data, while operating the clutch actuator so that the high gear transmission state is created when the vehicle speed is within a predetermined high gear range which is higher than the low gear range, operates the clutch actuator so that an idling state in which both of the low gear and high gear clutch mechanisms are in a disengaged state is created in a period from a start to a completion of a switching operation between the low gear transmission state and the high gear transmission state, operates the HST actuator so that an actual vehicle speed gear ratio, which causes the vehicle speed at the point in time where the switching operation is completed to match an actual vehicle speed that is attained immediately before the switching operation is completed, is set to the HST in the idling state, and uses an excess correction gear ratio, which is obtained by multiplying the reference HST gear ratio by a predetermined excess coefficient, as the control target value of the HST actuator in a predetermined time period from the point in time where the switching operation is completed.

In the second mode, preferably, in a case where a traveling load applied to the travel output shaft exceeds a predetermined value in the low gear transmission state and the high gear transmission state, the control device adds, to the reference HST gear ratio, a load correction value corresponding to the traveling load applied to the travel output shaft at the time of calculating the control target value of the HST actuator.

To achieve the above-described goal, the third mode of the present invention provides a transmission structure including: a low gear transmission mechanism that is capable of operatively transmitting a rotational power of a drive shaft, which is operatively coupled with a drive source, to a travel output shaft, which is operatively coupled with a drive wheel, at a that operatively transmits the rotational power of the drive shaft to the travel output shaft at a high gear ratio for attaining a higher speed than at the low gear ratio; a low gear clutch mechanism and a high gear clutch mechanism that engage and disengage power transmission of the low gear transmission mechanism and the high gear transmission mechanism, respectively; a clutch actuator that switches operation states of the low gear clutch mechanism and the high gear clutch mechanism; a Hydro Static Transmission (HST) that is capable of performing a continuously-variable gear shift of the rotational power in each of a low gear transmission state and a high gear transmission state which are created by the low gear transmission mechanism and the high gear transmission mechanism; an HST actuator that operates an output adjusting member of the HST; a gear shift operation member; a vehicle speed sensor that directly or indirectly detects a vehicle speed; an HST sensor that directly or indirectly detects an output rotation speed of the HST; and a control device that has HST control data, which is for obtaining a gear ratio of the HST corresponding to an operating position of the gear shift operation member and includes low gear HST control data used in the low gear transmission state where the low gear clutch mechanism is in an engaged state and high gear HST control data used in the high gear transmission state where the high gear clutch mechanism is in an engaged state, wherein the control device operates the HST actuator using, as a control target value, a reference HST gear ratio that is obtained by applying the operating position of the gear shift operation member to the low gear HST control data, while operating the clutch actuator so that the low gear transmission state is created when the vehicle speed is within a predetermined low gear range, operates the HST actuator using, as the control target value, a reference HST gear ratio that is obtained by applying an operating position of the gear shift operation member to the high gear HST control data, while operating the clutch actuator so that the high gear transmission state is created when the vehicle speed is within a predetermined high gear range which is higher than the low gear range, adds, to the reference HST gear ratio, a load correction value corresponding to a traveling load applied to the travel output shaft at the time of calculating the control target value of the HST actuator in a case where the traveling load applied to the travel output shaft exceeds a predetermined value in the low gear transmission state and the high gear transmission state, operates the clutch actuator so that an idling state in which both of the low gear and high gear clutch mechanisms are in a disengaged state is created in a period from a start to a completion of a switching operation between the low gear transmission state and the high gear transmission state, operates the HST actuator so that an actual vehicle speed gear ratio, which causes the vehicle speed at the point in time where the switching operation is completed to match an actual vehicle speed that is attained immediately before the switching operation is completed, is set to the HST in the idling state, and uses an excess correction gear ratio, which is obtained by multiplying the reference HST gear ratio by a predetermined excess coefficient, as the control target value of the HST actuator in a predetermined time period from the point in time where the switching operation is completed in a case where the load correction value is present at the point in time where the gear switching operation is started.

In the second and third modes, preferably, according to the traveling load applied to the travel output shaft, the control device changes a value of the excess coefficient and/or a predetermined time period in which the excess correction gear ratio is used.

Further, in the second and third modes, preferably, after an end of the predetermined time period from the point in time where the switching operation is completed, the control device uses, as the control target value of the HST actuator, a gear ratio that is obtained by adding a difference between the excess correction gear ratio and the reference HST gear ratio at the point in time where the predetermined time period ends to the reference HST gear ratio while reducing the difference at a predetermined rate that is set in advance.

The transmission structure according to various configurations of the first to third modes can include: a planetary gear mechanism including first to third elements, in which the third element functions as an HST input part that inputs an output rotational power from the HST; an input-side first transmission mechanism that is capable of operatively transmitting the rotational power of the drive source to the first element at an input-side first gear ratio; an input-side second transmission mechanism that is capable of operatively transmitting the rotational power of the drive source to the second element at an input-side second gear ratio; friction-plate-type input-side first and second clutch mechanisms that engage and disengage power transmission of the input-side first and second transmission mechanisms, respectively; a gear shift output shaft; an output-side first transmission mechanism that is capable of operatively transmitting a rotational power of the second element to the gear shift output shaft at an output-side first gear ratio; an output-side second transmission mechanism that is capable of operatively transmitting a rotational power of the first element to the gear shift output shaft at an output-side second gear ratio; friction-plate-type output-side first and second clutch mechanisms that engage and disengage power transmission of the output-side first and second transmission mechanisms, respectively; a forward-side transmission mechanism and a reverse-side transmission mechanism that operatively transmit a rotational power of the gear shift output shaft to the travel output shaft as a drive rotational power toward a forward-traveling direction and a reverse-traveling direction, respectively; friction-plate-type forward-side and reverse-side clutch mechanisms that engage and disengage power transmission of the forward-side transmission mechanism and the reverse-side transmission mechanism, respectively; an output-side third transmission mechanism that is capable of operatively transmitting the rotational power of the first element to the travel output shaft as the drive rotational power in the forward-traveling direction, wherein the gear ratio is set so that a rotation speed of the travel output shaft that is attained when the rotational power of the first element is operatively transmitted to the travel output shaft via the output-side third transmission mechanism is higher than a rotation speed of the travel output shaft that is attained when the rotational power of the first element is operatively transmitted to the travel output shaft via the output-side second transmission mechanism and the forward-side transmission mechanism; and an output-side third clutch mechanism that engages and disengages power transmission of the output-side third transmission mechanism.

The clutch actuator switches operation states of the input-side first and second clutch mechanisms, the output-side first to third clutch mechanisms, and the forward-side and reverse-side clutch mechanisms, and the HST performs a continuously-variable gear shift according to an operating position of the output adjusting member between a first HST gear ratio, which causes an output of the HST to be a rotational power in one of forward and reverse rotation, and a second HST gear ratio, which causes an output of the HST to be a rotational power in the other one of the forward and reverse rotation.

The HST and the planetary gear mechanism are configured so that, in a first HMT transmission state where the input-side first and second clutch mechanisms are respectively in an engaged state and a disengaged state and the first element functions as a reference power input part that inputs a reference rotational power from the drive source and the second element functions as a composite power output part that outputs a composite rotational power toward the gear shift output shaft, the output rotational power of the second element becomes a zero speed when the HST is set to a zero speed gear ratio and the output rotational power of the second element is accelerated as the HST is shifted from the zero speed gear ratio toward the second HST gear ratio, and, in a second HMT transmission state where the input-side first and second clutch mechanisms are respectively in a disengaged state and an engaged state and the second element functions as the reference power input part and the first element functions as the composite power output part, the output rotational power of the first element is accelerated as the HST is shifted from the second HST gear ratio toward the first HST gear ratio.

The control device operates the clutch actuator, in a first gear range where the vehicle speed is in a range from the zero speed to a predetermined first/second switching speed, so as to create the first HMT transmission state and then create a first gear transmission state in which the output-side first and second clutch mechanisms are respectively brought into an engaged state and a disengaged state and the forward-side clutch mechanism is brought into an engaged state, thereby operatively transmitting the rotational power of the second element to the travel output shaft via the gear shift output shaft, operates the clutch actuator, in a second gear range where the vehicle speed is in a range from the first/second switching speed to a second/third switching speed which is higher than the first/second switching speed, so as to create the second HMT transmission state and then create a second gear transmission state in which the output-side first and second clutch mechanisms are respectively brought into a disengaged state and an engaged state and the forward-side clutch mechanism is brought into an engaged state, thereby operatively transmitting the rotational power of the first element to the travel output shaft via the gear shift output shaft, operates the clutch actuator, in a third gear range where the vehicle speed is higher than the second/third switching speed, so as to create the second HMT transmission state and then create a third gear transmission state in which the output-side first and second clutch mechanisms are brought into a disengaged state and the output-side third clutch mechanism is brought into an engaged state, thereby operatively transmitting the rotational power of the first element to the travel output shaft without via the gear shift output shaft, operates the HST actuator, when the vehicle speed is within the first gear range, so that the HST is set to the zero speed gear ratio or a predetermined creep speed gear ratio in response to an operation on the gear shift operation member to a lowest speed position and the HST is shifted toward the second HST gear ratio in response to an acceleration operation on the gear shift operation member, operates the HST actuator, when the vehicle speed is within the second gear range, so that the HST is shifted toward the first HST gear ratio in response to an acceleration operation on the gear shift operation member, and operates the HST actuator, when the vehicle speed is within the third gear range, so that the HST is shifted toward the first HST gear ratio in response to an acceleration operation on the gear shift operation member.

In this case, a transmission mechanism that creates the second gear transmission state is the low gear transmission mechanism, and a transmission mechanism that creates the third gear transmission state is the high gear transmission mechanism.

Preferably, the input-side first and second gear ratios are set so that a rotation speed of the second element that is attained when the HST is set to a first/second gear switching gear ratio in the first HMT transmission state is the same as a rotation speed of the second element caused by the rotational power transmitted via the input-side second transmission mechanism in the second HMT transmission state, and so that a rotation speed of the first element that is attained when the HST is set to the first/second gear switching gear ratio in the second HMT transmission state is substantially the same as a rotation speed of the first element caused by the rotational power transmitted via the input-side first transmission mechanism in the first HMT transmission state, and the output-side first and second gear ratios are set so that a rotation speed created in the gear shift output shaft when the output of the HST is set to the first/second gear switching gear ratio in the first HMT transmission state is substantially the same as a rotation speed created in the gear shift output shaft when the HST is set to the first/second gear switching gear ratio in the second HMT transmission state.

To achieve the above-described goal, the fourth mode of the present invention provides a transmission structure including: a Hydro Static Transmission (HST) that is capable of performing a continuously-variable gear shift between a first HST gear ratio, at which a rotational power operatively input from a drive source is output as a rotational power in one of forward and reverse rotation, and a second HST gear ratio, at which the rotational power is output as a rotational power in the other one of the forward and reverse rotation, in accordance with an operating position of an output adjusting member; an HST actuator that operates the output adjusting member of the HST; a gear shift operation member; a planetary gear mechanism including first to third elements, in which the third element functions as an HST input part that inputs the rotational power output from the HST; an input-side first transmission mechanism that is capable of operatively transmitting the rotational power of the drive source to the first element at an input-side first gear ratio; an input-side second transmission mechanism that is capable of operatively transmitting the rotational power of the drive source to the second element at an input-side second gear ratio; friction-plate-type input-side first and second clutch mechanisms that engage and disengage power transmission of the input-side first and second transmission mechanisms, respectively; a gear shift output shaft; an output-side first transmission mechanism that is capable of operatively transmitting a rotational power of the second element to the gear shift output shaft at an output-side first gear ratio; an output-side second transmission mechanism that is capable of operatively transmitting a rotational power of the first element to the gear shift output shaft at an output-side second gear ratio; friction-plate-type output-side first and second clutch mechanisms that engage and disengage power transmission of the output-side first and second transmission mechanisms, respectively; a clutch actuator that switches operation states of the clutch mechanisms; a vehicle speed sensor that directly or indirectly detects a vehicle speed; an HST sensor that directly or indirectly detects an output rotation speed of the HST; and a control device that performs operation control of the HST actuator and the clutch actuator.

In the fourth mode, the HST and the planetary gear mechanism are configured so that, in a first HMT transmission state where the input-side first and second clutch mechanisms are respectively in an engaged state and a disengaged state and the first element functions as a reference power input part that inputs a reference rotational power from the drive source and the second element functions as a composite power output part that outputs a composite rotational power toward the gear shift output shaft, an output rotational power of the second element becomes a zero speed when the HST is set to a zero speed gear ratio and the output rotational power of the second element is accelerated as the HST is shifted from the zero speed gear ratio toward the second HST gear ratio, and, in a second HMT transmission state where the input-side first and second clutch mechanisms are respectively in a disengaged state and an engaged state and the second element functions as the reference power input part and the first element functions as the composite power output part, an output rotational power of the first element is accelerated as the HST is shifted from the second HST gear ratio toward the first HST gear ratio.

The input-side first and second gear ratios are set so that a rotation speed of the second element that is attained when the HST is set to a first/second gear switching gear ratio in the first HMT transmission state is the same as a rotation speed of the second element caused by the rotational power transmitted via the input-side second transmission mechanism in the second HMT transmission state, and so that a rotation speed of the first element that is attained when the HST is set to the first/second gear switching gear ratio in the second HMT transmission state is substantially the same as a rotation speed of the first element caused by the rotational power transmitted via the input-side first transmission mechanism in the first HMT transmission state, and the output-side first and second gear ratios are set so that a rotation speed created in the gear shift output shaft when the HST is set to the first/second gear switching gear ratio in the first HMT transmission state is substantially the same as a rotation speed created in the gear shift output shaft when the HST is set to the first/second gear switching gear ratio in the second HMT transmission state.

The control device stores HST control data, which is for obtaining a reference HST gear ratio of the HST corresponding to an operating position of the gear shift operation member and includes first gear HST control data used in the first HMT transmission state and second gear HST control data used in the second HMT transmission state, and stores a load correction data, which is for obtaining a load correction value to be added to the reference HST gear ratio in accordance with a traveling load applied to the gear shift output shaft.

The control device operates the clutch actuator, in a first gear range where the vehicle speed is in a range from the zero speed to a predetermined first/second switching speed, so as to create the first HMT transmission state and then create a first gear transmission state in which the output-side first and second clutch mechanisms are respectively brought into an engaged state and a disengaged state, thereby operatively transmitting the rotational power of the second element to the gear shift output shaft, operates the clutch actuator, in a second gear range where the vehicle speed is higher than the first/second switching speed, so as to create the second HMT transmission state and then create a second gear transmission state in which the output-side first and second clutch mechanisms are respectively brought into a disengaged state and an engaged state, thereby operatively transmitting the rotational power of the first element to the gear shift output shaft, operates the HST actuator, when the vehicle speed is within the first gear range, using, as a control target value, a reference HST gear ratio obtained by applying the operating position of the gear shift operation member to the first gear HST control data, so that the HST is set to the zero speed gear ratio or a predetermined creep speed gear ratio in response to an operation on the gear shift operation member to a lowest speed position and the HST is shifted toward the second HST gear ratio in response to an acceleration operation on the gear shift operation member, operates the HST actuator, when the vehicle speed is within the second gear range, using, as the control target value, a reference HST gear ratio obtained by applying the operating position of the gear shift operation member to the second gear HST control data, so that the HST is shifted toward the first HST gear ratio in response to an acceleration operation on the gear shift operation member, operates the HST actuator, in a case where the traveling load applied to the gear shift output shaft exceeds a predetermined value, using, as the control target value, a load correction HST gear ratio obtained by adding the load correction value, which is obtained by applying the traveling load to the load correction data, to the reference HST gear ratio, and calculates the load correction HST gear ratio, in a case where the control target value of the HST actuator includes the load correction value at the point in time where switching of the first gear transmission state and the second gear transmission state is started, by adding, in a direction that causes an excess change in the vehicle speed, an absolute value of the load correction value to the reference HST gear ratio, which is obtained by applying the operating position of the gear shift operation member to the HST control data, so as to operate the HST actuator using the load correction HST gear ratio as the control target value at the point in time where the switching is completed.

Advantageous Effects of Invention

With a transmission structure according to the present invention, the vehicle speed responsiveness at the time of switching between a low gear transmission state created by a low gear transmission mechanism and a high gear transmission state created by a high gear transmission mechanism can be improved.

DESCRIPTION OF EMBODIMENTS

First Embodiment

Hereinafter, with reference to the accompanying drawings, an explanation is given of an embodiment of a transmission structure according to the present invention.

Figure 1:
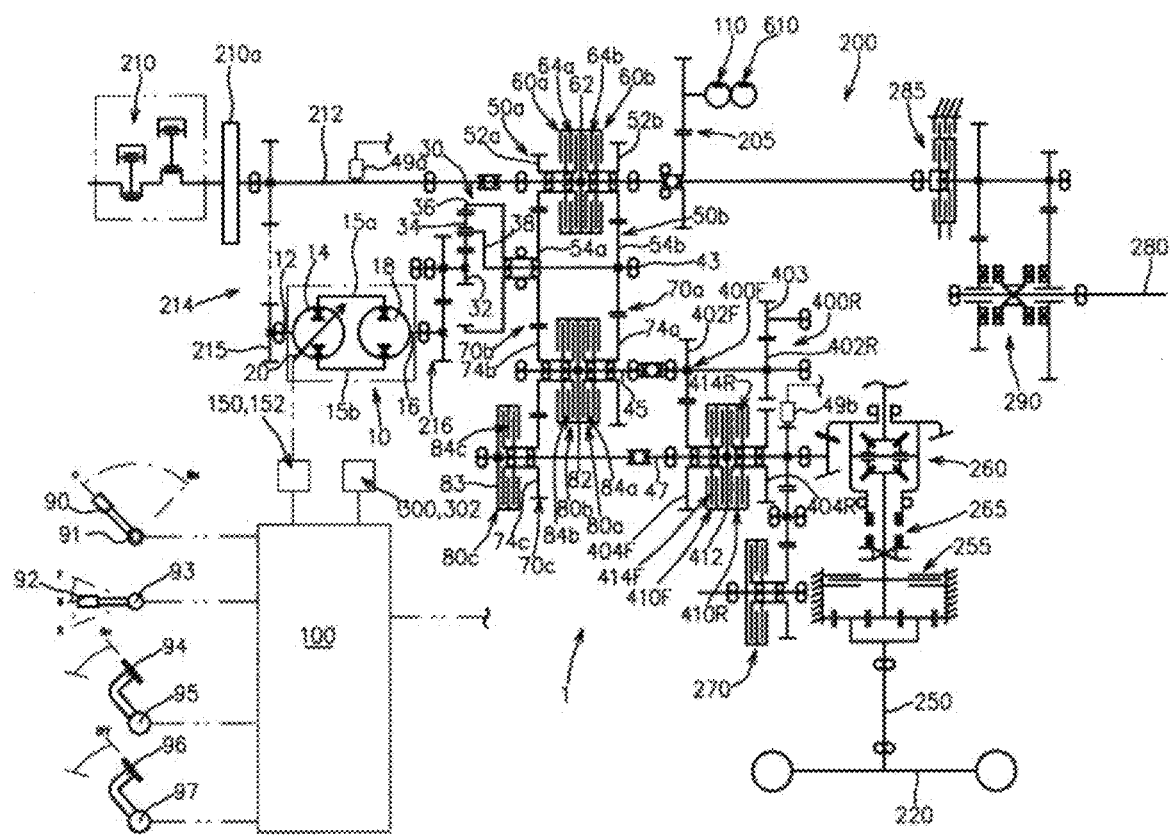
FIG. 1 is a schematic diagram of the power transmission in a work vehicle to which the transmission structure according to the first embodiment of the present invention is applied.

In FIG. 1, a schematic diagram of power transmission in the work vehicle 200 to which the transmission structure 1 according to the present embodiment is applied is illustrated.

Figure 2:
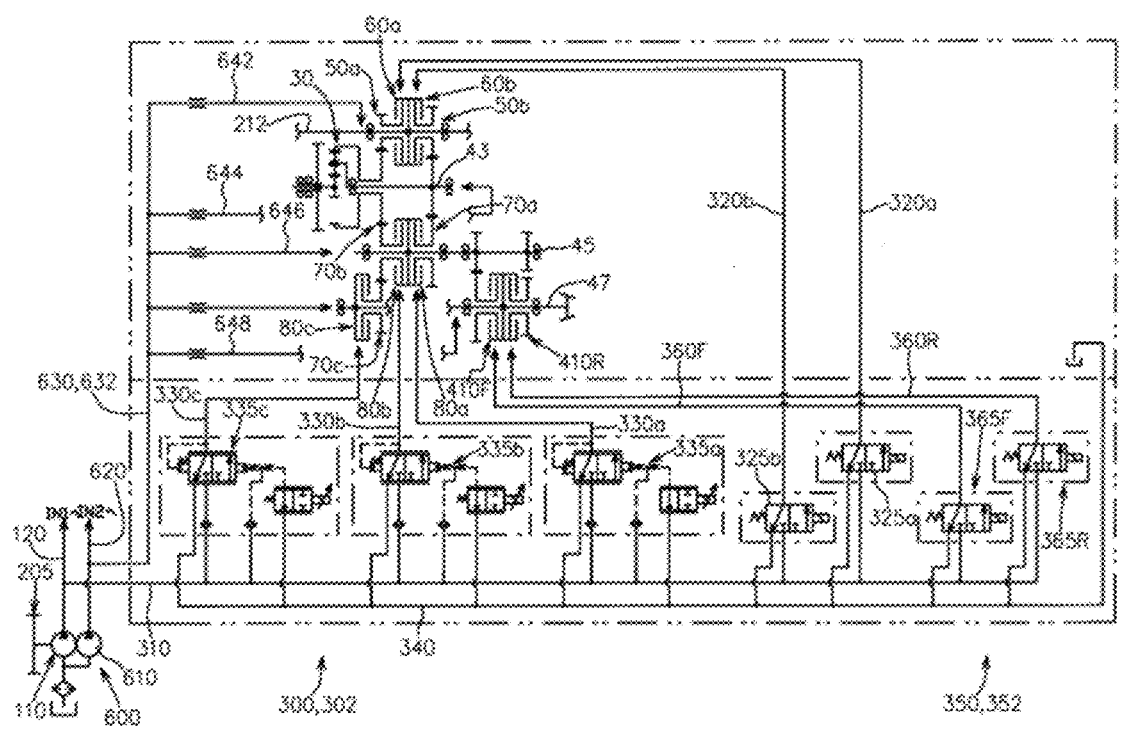
FIG. 2 is a hydraulic circuit diagram of a part of the transmission structure according to the first embodiment.

Further, in FIG. 2, a hydraulic circuit diagram of a part of the transmission structure 1 is illustrated.

As illustrated in FIG. 1, the work vehicle 200 includes the drive source 210, the drive wheel 220, and the transmission structure 1 interposed in a travel-system power transmission path from the drive source 210 to the drive wheel 220. Note that the sign 210a in FIG. 1 and FIG. 2 is a flywheel included in the drive source 210.

As illustrated in FIG. 1, the transmission structure 1 includes a Hydro Static Transmission (HST) 10, the planetary gear mechanism 30 that operates in a cooperative manner with the HST 10 so as to form a hydro-static/mechanical continuously-variable gear shift structure (Hydro Mechanical Transmission/HMT), the gear shift output shaft 45, a gear shift operation member including the vehicle speed setting member 90 such as a gear shift lever, and the control device 100.

Figure 3:
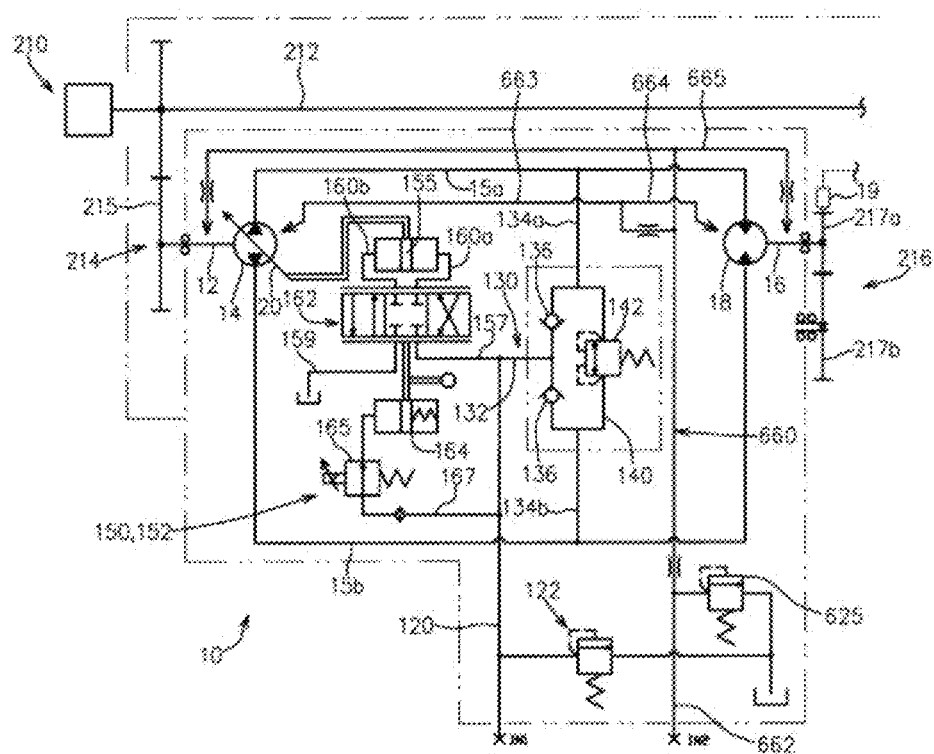
FIG. 3 is a hydraulic circuit diagram of an HST, which is a part of the transmission structure according to the first embodiment.

In FIG. 3, a hydraulic circuit diagram of the HST 10 is illustrated. Note that IN1 and IN2 in FIG. 2 are fluidly connected to IN1 and IN2 in FIG. 3, respectively.

As illustrated in FIG. 1 and FIG. 3, the HST 10 includes the pump shaft 12 that is operatively driven in a rotary manner by the drive source 210, the HST pump 14 that is supported by the pump shaft 12 in a manner not capable of relative rotation, the HST motor 18 that is fluidly connected to the HST pump 14 via the pair of first and second HST lines 15a and 15b so as to be hydraulically driven in a rotary manner by the HST pump 14, the motor shaft 16 that supports the HST motor 18 in a manner not capable of relative rotation, and the output adjusting member 20 that changes the inner volume of at least one of the HST pump 14 and the HST motor 18.

The HST 10 is designed so as to continuously vary the ratio of the rotation speed of the HST output, which is output from the motor shaft 16, to the rotation speed of the power input to the pump shaft 12 (that is, the gear ratio of the HST 10) in accordance with the operating position of the output adjusting member 20.

That is, the HST is configured to have a continuously-variable gear ratio between the first HST gear ratio and the second HST gear ratio in accordance with an operating position of the output adjusting member 20, and thus the HST output, which is output from the motor shaft, is shifted in a continuously-variable manner between the first HST speed where the first HST gear ratio is set and the second HST speed where the second HST gear ratio is set.

Note that, in the present embodiment, as illustrated in FIG. 1 and FIG. 3, the pump shaft 12 is coupled via the HST input gear train 214 to the main drive shaft 212, which is operatively coupled to the drive source 210.

In the present embodiment, the HST 10 is capable of switching the rotational direction of the HST output between forward and reverse directions.

That is, the HST 10 is configured so that the neutral gear ratio N which causes the output from the motor shaft 16 to be a neutral speed (zero speed) is set when the output adjusting member 20 is positioned at the neutral position, regardless of the presence or absence of a rotational power input to the pump shaft 12.

Furthermore, the HST 10 is configured to be shifted from the neutral gear ratio N to the first HST gear ratio side as the output adjusting member 20 is operated from the neutral position to one side, thereby accelerating the output from the motor shaft 16 from the neutral speed in one of the forward and reverse directions (e.g., in the reverse direction) with respect to the rotational direction of the input to the pump shaft 12, and is configured to be shifted from the neutral gear ratio N to the second HST gear ratio side as the output adjusting member 20 is operated from the neutral position to the other side, thereby accelerating the output from the motor shaft 16 from the neutral speed in the other one of the forward and reverse directions (e.g., in the forward direction) with respect to the rotational direction of the input to the pump shaft 12.

In the present embodiment, as the output adjusting member 20 commonly known as an axial piston pump, the HST 10 has a movable swash plate that changes the inner volume of the HST pump 14 by being swung about a swing axis and can swing to one side and the other side about the swing axis with the neutral position placed therebetween, where the amount of discharge from the HST pump 14 is set to zero.

When the movable swash plate is positioned in the neutral position, there is no pressurized oil discharged from the HST pump 14, and thus the HST 10 is brought into a neutral state where the output of the HST motor 18 is zero.

Furthermore, when the movable swash plate is swung from the neutral position to the forward rotation side about the swing axis, the pressurized oil is supplied from the HST pump 14 to one of the pair of HST lines 15 (e.g., to the first HST line 15a), and thus the one of the lines, i.e., the first HST line 15a, is brought into the high pressure side, and the other one of the lines, i.e., the second HST line 15b, is brought into the low pressure side. Accordingly, the HST motor 18 is driven in a rotary manner to the forward rotation side, and thus the HST 10 is brought into the forward rotation output state.

Conversely, when the movable swash plate is swung from the neutral position to the reverse side about the swing axis, the pressurized oil is supplied from the HST pump 14 to the other one of the pair of HST lines 15 (e.g., to the second HST line 15b), and thus the other one of the lines, i.e., the second HST line 15b, is brought into the high pressure side, and the one of the lines, i.e., the first HST line 15a, is brought into the low pressure side. Accordingly, the HST motor 18 is driven in a rotary manner to the reverse rotation side, and thus the HST 10 is brought into the reverse rotation output state.

Note that, in the HST 10, the inner volume of the HST motor 18 is fixed by a fixed swash plate.

As illustrated in FIG. 3, the HST 10 includes the charge line 130 that supplies the pressurized oil to the pair of first and second HST lines 15a and 15b.

In detail, as illustrated in FIG. 2, the transmission structure 1 includes the first hydraulic pump 110, which is operatively driven by the drive source 210, and the operation oil line 120, to which the oil discharged from the first hydraulic pump 110 is supplied.

In the present embodiment, the first hydraulic pump 110 is operatively coupled to the main drive shaft 212 via the pump driving gear train 205 (see FIG. 1).

The oil pressure of the operation oil line 120 is set by the relief valve 122 (see FIG. 3).

As illustrated in FIG. 3, the charge line 130 includes the common section 132 with its base end side fluidly connected to the operation oil line 120, the first branch section 134a with its base end side fluidly connected to the common section 132 and its tip side fluidly connected to the first HST line 15a, and the second branch section 134b with its base end side fluidly connected to the common section 132 and its tip side fluidly connected to the second HST line 15b.

In the first and second branch sections 134a and 134b, the check valves 136 that allow the pressurized oil to flow from the common section 132 to the corresponding HST lines 15a and 15b and prevent the pressurized oil from flowing in the reverse direction are interposed.

Note that, as illustrated in FIG. 3, the HST 10 further includes the communication line 140, which allows communication between the pair of first and second HST lines 15a and 15b, and the bidirectional relief valve 142, which is interposed in the communication line 140.

In a case where one of the pair of HST lines 15a and 15b has an abnormally high pressure, the communication line 140 and the bidirectional relief valve 142 cause the pressurized oil in the one of the HST lines to flow into the other one of the HST lines.

As illustrated in FIG. 1, the output adjusting member 20 is operatively controlled by the control device 100 in accordance with operations to the vehicle speed setting member 90.

That is, the transmission structure 1 according to the present embodiment includes the HST actuator 150 that operates the output adjusting member 20, and, as the reference HST control, the control device 100 performs the operation control of the HST actuator 150 such that the output adjusting member 20 is set to the operating position that defines the reference HST gear ratio according to an operation to the vehicle speed setting member 90. Note that the details of the HST control performed by the control device is described later.

The HST actuator 150 can employ various configurations, such as an electric motor and a hydraulic mechanism, as long as the operation control can be performed by the control device 100.

As illustrated in FIG. 3, the transmission structure 1 according to the present embodiment includes the hydraulic servo mechanism 152 as the HST actuator 150.

The hydraulic servo mechanism 152 includes: the servo piston 155 that is capable of reciprocating in the axial direction with the first and second oil chambers respectively defined on one side and the other side in the axial direction; the servo pressurized oil line 157 with its base end side fluidly connected to the operation oil line 120; the drain line 159; the first and second servo supply-drain lines 160a and 160b respectively fluidly connected to the first and second oil chambers; the servo switching valve 162 that switches the connecting states of the servo pressurized oil line 157, the drain line 159, the first servo supply-drain line 160a, and the second servo supply-drain line 160b; and the operation piston 164 operatively coupled to the servo switching valve 162.

The servo piston 155 is operatively coupled to the movable swash plate so as to cause the movable swash plate, which functions as the output adjusting member 20, to swing about the swing axis line according to its movement in the axial direction.

The servo switching valve 162 is designed so as to be selectively set to a closing position where the first and second servo supply-drain lines 160a and 160b are closed, a first operation position where the first servo supply-drain line 160a is fluidly connected to the servo pressurized oil line 157 and the second servo supply-drain line 160b is fluidly connected to the drain line 159, or a second operation position where the first servo supply-drain line 160a is fluidly connected to the drain line 159 and the second servo supply-drain line 160b is fluidly connected to the servo pressurized oil line 157.

The operation piston 164 is configured so as to be set to a first operating position, a holding position, and a second operating position that respectively positions the servo switching valve 162 in the first operation position, the closing position, and the second operation position.

In the present embodiment, the operation piston 164 is capable of reciprocating in the axial direction with an oil chamber and a spring chamber respectively defined on one side and the other side in the axial direction and is pressed in the direction to contract the oil chamber by a biasing spring placed in the spring chamber.

The hydraulic servo mechanism 152 further includes the servo operation line 167 with its base end side fluidly connected to the operation oil line 120 and its tip side fluidly connected to the oil chamber, and the output adjusting valve 165 capable of adjusting the amount of pressurized oil in the servo operation line 167.

The output adjusting valve 165 is designed so that its operation control can be performed by the control device 100.

That is, in a case where the reference HST control is performed, the control device 100 operates the output adjusting valve 165 so that the output adjusting member 20 is positioned in the operation position corresponding to the operating position of the vehicle speed setting member 90.

Note that the operating position of the vehicle speed setting member 90 is detected by the vehicle speed setting sensor 91, such as a potentiometer, for example.

As illustrated in FIG. 1, the planetary gear mechanism 30 includes the sun gear 32, the planetary gear 34 that meshes with the sun gear 32, the internal gear 36 that meshes with the planetary gear 34, and the carrier 38 that supports the planetary gear 34 in a rotatable manner about its axial line and rotates about the axial line of the sun gear 32 in conjunction with the planetary gear 34's revolution around the sun gear 32. Further, the sun gear 32, the carrier 38, and the internal gear 36 form three planetary elements.

The third element, which is one of the three planetary elements, is operatively coupled to the motor shaft 16, and the third element functions as a variable power input part that inputs the HST output.

As illustrated in FIG. 1, the sun gear 32 is the third element in the present embodiment.

Note that, in the present embodiment, the sun gear 32 is operatively coupled to the motor shaft 16 via the HST output gear train 216.

The transmission structure 1 according to the present embodiment can perform switching between a first HMT transmission state, in which the first element is caused to function as a reference power input part that inputs a reference rotational power from the drive source 210 and the second element is caused to function as a composite power output part that outputs a composite rotational power, and a second HMT transmission state, in which the first element is caused to function as the composite power output part and the second element is caused to function as the reference power input part.

Specifically, as illustrated in FIG. 1 and FIG. 2, the transmission structure 1 further includes: the input-side first transmission mechanism 50a and the input-side second transmission mechanism 50b that are capable of operatively transmitting the rotational power of the drive source 210 to the first element and the second element, respectively; the input-side clutch mechanism pair including the input-side first clutch mechanism 60a and the input-side second clutch mechanism 60b that engage and disengage the power transmission of the input-side first transmission mechanism 50a and the input-side second transmission mechanism 50b, respectively; the output-side first transmission mechanism 70a and the output-side second transmission mechanism 70b that are capable of operatively transmitting the rotational power of the second element and the first element, respectively, to the gear shift output shaft 45; and the output-side clutch mechanism pair including the output-side first clutch mechanism 80a and the output-side second clutch mechanism 80b that engage and disengage the power transmission of the output-side first transmission mechanism 70a and the output-side second transmission mechanism 70b, respectively.

In the present embodiment, the internal gear 36 and the carrier 38 function as the first and second elements, respectively.

The input-side first transmission mechanism 50a is configured to be capable of transmitting the rotational power of the drive source 210 to the first element (the internal gear 36 in the present embodiment).

In detail, as illustrated in FIG. 1, the input-side first transmission mechanism 50a includes the input-side first driving gear 52a coupled to the main drive shaft 212 in a manner capable of relative rotation, and the input-side first following gear 54a that is meshed with the input-side first driving gear 52a and is operatively coupled to the first element.

As illustrated in FIG. 1, the transmission structure 1 according to the present embodiment includes the gear shift middle shaft 43 placed coaxially with the planetary gear mechanism 30 and coupled to the second element in a manner not capable of relative rotation about its axis, and the input-side first following gear 54a is operatively coupled to the input-side first driving gear 52a and the first element (the internal gear 36 in the present embodiment) in a state of being supported by the gear shift middle shaft 43 in a manner capable of relative rotation.

The input-side second transmission mechanism 50b is configured to be capable of transmitting the rotational power of the drive source 210 to the second element (the carrier 38 in the present embodiment).

In detail, as illustrated in FIG. 1, the input-side second transmission mechanism 50b includes the input-side second driving gear 52b supported by the main drive shaft 212 in a manner capable of relative rotation, and the input-side second following gear 54b that is meshed with the input-side second driving gear 52b and is operatively coupled to the second element.

In the present embodiment, the input-side second following gear 54b is meshed with the input-side second driving gear 52b in a state of being supported in a manner not capable of relative rotation on the gear shift middle shaft 43, which is coupled to the second element in a manner not capable of relative rotation.

In the present embodiment, the input-side first and second clutch mechanisms 60a and 60b are friction-plate-type clutch mechanisms.

The input-side first and second clutch mechanisms 60a and 60b are supported by the main drive shaft 212 so as to engage and disengage the input-side first and second driving gears 52a and 52b with and from the main drive shaft 212, respectively.

In detail, the input-side first clutch mechanism 60a includes: the input-side clutch housing 62 supported by the main drive shaft 212 in a manner not capable of relative rotation; the input-side first friction plate group 64a that includes the first driving-side friction plate supported by the input-side clutch housing 62 in a manner not capable relative rotation and the first following-side friction plate supported by the input-side first driving gear 52a so as to be opposed by the first driving-side friction plate in a manner not capable of relative rotation; and an input-side first piston (not illustrated in the drawings) that frictionally engages the input-side first friction plate group 64a.

The input-side second clutch mechanism 60b includes: the input-side clutch housing 62; the input-side second friction plate group 64b that includes the second driving-side friction plate supported by the input-side clutch housing 62 in a manner not capable relative rotation and the second following-side friction plate supported by the input-side second driving gear 52b so as to be opposed by the second driving-side friction plate in a manner not capable of relative rotation; and an input-side second piston (not illustrated in the drawings) that frictionally engages the input-side second friction plate group 64b.

The output-side first transmission mechanism 70a is configured so as to be capable of transmitting the rotational power of the second element to the gear shift output shaft 45.

In the present embodiment, the output-side first transmission mechanism 70a is configured to be capable of operatively transmitting the rotational power of the second element to the gear shift output shaft 45 by using the input-side second following gear 54b in the input-side second transmission mechanism 50b.

In detail, as illustrated in FIG. 1, the output-side first transmission mechanism 70a includes the input-side second following gear 54b and the output-side first following gear 74a which is operatively coupled to the input-side second following gear 54b in a state of being supported by the gear shift output shaft 45 in a manner capable of relative rotation.

The output-side second transmission mechanism 70b is configured to be capable of transmitting the rotational power of the first element to the gear shift output shaft 45.

In the present embodiment, the output-side second transmission mechanism 70b is configured to be capable of operatively transmitting the rotational power of the first element to the gear shift output shaft 45 by using the input-side first following gear 54a in the input-side first transmission mechanism 50a.

In detail, as illustrated in FIG. 1, the output-side second transmission mechanism 70b includes the input-side first following gear 54a and the output-side second following gear 74b which is operatively coupled to the input-side first following gear 54a in a state of being supported by the gear shift output shaft 45 in a manner capable of relative rotation.

The output-side first and second clutch mechanisms 80a and 80b are friction-plate-type clutch mechanisms.

In the present embodiment, the output-side first and second clutch mechanisms 80a and 80b are supported by the gear shift output shaft 45 so as to engage and disengage the output-side first and second following gears 74a and 74b with and from the gear shift output shaft 45, respectively.

In detail, the output-side first clutch mechanism 80a includes: the output-side clutch housing 82 supported by the gear shift output shaft 45 in a manner not capable of relative rotation; the output-side first friction plate group 84a that includes the first driving-side friction plate supported by the output-side first following gear 74a in a manner not capable relative rotation and the first following-side friction plate supported by the output-side clutch housing 82 so as to be opposed by the first driving-side friction plate in a manner not capable of relative rotation; and an output-side first piston (not illustrated in the drawings) that frictionally engages the output-side first friction plate group.

The output-side second clutch mechanism 80b includes: the output-side clutch housing 82, the output-side second friction plate group 84b that includes the second driving-side friction plate supported by the output-side second following gear 74b in a manner not capable relative rotation and the second following-side friction plate supported by the output-side clutch housing 82 so as to be opposed by the second driving-side friction plate in a manner not capable of relative rotation; and an output-side second piston (not illustrated in the drawings) that frictionally engages the output-side second friction plate group.

The transmission structure 1 further includes the clutch actuator 300 that switches the engagement and disengagement of the input-side first clutch mechanism 60a, the input-side second clutch mechanism 60b, the output-side first clutch mechanism 80a, and the output-side second clutch mechanism 80b.

The clutch actuator 300 may employ various configurations, such as an electric motor and a hydraulic mechanism, as long as the operation control can be performed by the control device.

As illustrated in FIG. 2, the transmission structure 1 according to the present embodiment includes the clutch switching hydraulic mechanism 302 as the clutch actuator 300.

The clutch switching hydraulic mechanism 302 is configured so as to use the oil source (the first hydraulic pump 110) that is common to the charge line 130 of the HST 10 and to the hydraulic servo mechanism 152.

In detail, the clutch switching hydraulic mechanism 302 includes: the clutch line 310 with its base end side fluidly connected to the operation oil line 120; the input-side first supply-drain line 320a, the input-side second supply-drain line 320b, the output-side first supply-drain line 330a, and the output-side second supply-drain line 330b with their tip sides fluidly connected to the input-side first clutch mechanism 60a, the input-side second clutch mechanism 60b, the output-side first clutch mechanism 80a, and the output-side second clutch mechanism 80b, respectively; the drain line 340; and the input-side first solenoid valve 325a, the input-side second solenoid valve 325b, the output-side first solenoid valve 335a, and the output-side second solenoid valve 335b that are interposed between the clutch line 310 and drain line 340 and the input-side first supply-drain line 320a, input-side second supply-drain line 320b, output-side first supply-drain line 330a, output-side second supply-drain line 330b, respectively.

The input-side first solenoid valve 325a, the input-side second solenoid valve 325b, the output-side first solenoid valve 335a, and the output-side second solenoid valve 335b are operatively controlled by the control device 100, and can be set to a supply position which fluidly connects the corresponding supply-drain line 320a, 320b, 330a, or 330b to the clutch line 310, or a drain position that fluidly connects the corresponding supply-drain line 320a, 320b, 330a, or 330b to the drain line 340.

As illustrated in FIG. 2, in the present embodiment, the input-side first solenoid valve 325a and the input-side second solenoid valve 325b are solenoid switching valves that instantly increase/decrease the hydraulic pressures of the corresponding input-side first supply-drain line 320a and input-side second supply-drain line 320b.

On the other hand, the output-side first solenoid valve 335a and the output-side second solenoid valve 335b are solenoid proportional valves capable of adjusting the increasing/decreasing rates of the hydraulic pressures of the corresponding output-side first supply-drain line 330a and output-side second supply-drain line 330b.

As illustrated in FIG. 1, etc., the transmission structure 1 according to the present embodiment further includes: the travel output shaft 47 that outputs a drive rotational power toward the drive wheel 220; the forward-side transmission mechanism 400F and the reverse-side transmission mechanism 400R that operatively transmit the rotational power of the gear shift output shaft 45 to the travel output shaft 47 as drive rotational powers in the forward-traveling direction and reverse-traveling direction, respectively; and the friction-plate-type forward-side clutch mechanism 410F and reverse-side clutch mechanism 410R that engage and disengage the power transmission of the forward-side transmission mechanism 400F and reverse-side transmission mechanism 400R, respectively.

As illustrated in FIG. 1, in a state where the forward-side transmission mechanism 400F is supported by the travel output shaft 47 and the forward-side driving gear 402F which is supported by the gear shift output shaft 45, the forward-side transmission mechanism 400F has the forward-side gear train including the forward-side following gear 404F meshed with the forward-side driving gear 402F.

In the present embodiment, the forward-side driving gear 402F is supported by the gear shift output shaft 45 in a manner not capable of relative rotation, and the forward-side following gear 404F is supported by the travel output shaft 47 in a manner capable of relative rotation.

In a state where the reverse-side transmission mechanism 400R is supported by the travel output shaft 47 and the reverse-side driving gear 402R which is supported by the gear shift output shaft 45, the reverse-side transmission mechanism 400R has a reverse-side gear train including the reverse-side following gear 404R meshed with the reverse-side driving gear 402R via the idle gear 403 (see FIG. 1).

In the present embodiment, the reverse-side driving gear 402R is supported by the gear shift output shaft 45 in a manner not capable of relative rotation, and the reverse-side following gear 404R is supported by the travel output shaft 47 in a manner capable of relative rotation.

In the present embodiment, the forward-side clutch mechanism 410F and the reverse-side clutch mechanism 410R are supported by the travel output shaft 47 so as to engage and disengage the forward-side following gear 404F and the reverse-side following gear 404R with and from the travel output shaft 47, respectively.

In detail, the forward-side clutch mechanism 410F includes: the forward-reverse clutch housing 412 supported by the travel output shaft 47 in a manner not capable of relative rotation; the forward-side friction plate group 414F that includes a forward following-side friction plate supported by the forward-reverse clutch housing 412 in a manner not capable of relative rotation and a forward driving-side friction plate supported by the forward-side following gear 404F in a manner not capable of relative rotation so as to be opposed by the forward following-side friction plate; and a forward-side piston (not illustrated in the drawings) that frictionally engages the forward-side friction plate group 414F.

The reverse-side clutch mechanism 410R includes: the forward-reverse clutch housing 412; the reverse-side friction plate group 414R that includes a reverse following-side friction plate supported by the forward-reverse clutch housing 412 in a manner not capable of relative rotation and a reverse driving-side friction plate supported by the reverse-side following gear 404R in a manner not capable of relative rotation so as to be opposed by the reverse following-side friction plate; and a reverse-side piston (not illustrated in the drawings) that frictionally engages the reverse-side friction plate group 414R.

The clutch actuator 300 further includes the forward-reverse switching actuator 350 that switches the engagement and disengagement of the forward-side clutch mechanism 410F and the reverse-side clutch mechanism 410R.

The forward-reverse switching actuator 350 is configured to be operatively controlled by the control device in accordance with operations to the gear shift operation member, so as to engage and disengage the forward-side clutch mechanism 410F and the reverse-side clutch mechanism 410R.

Figure 4:
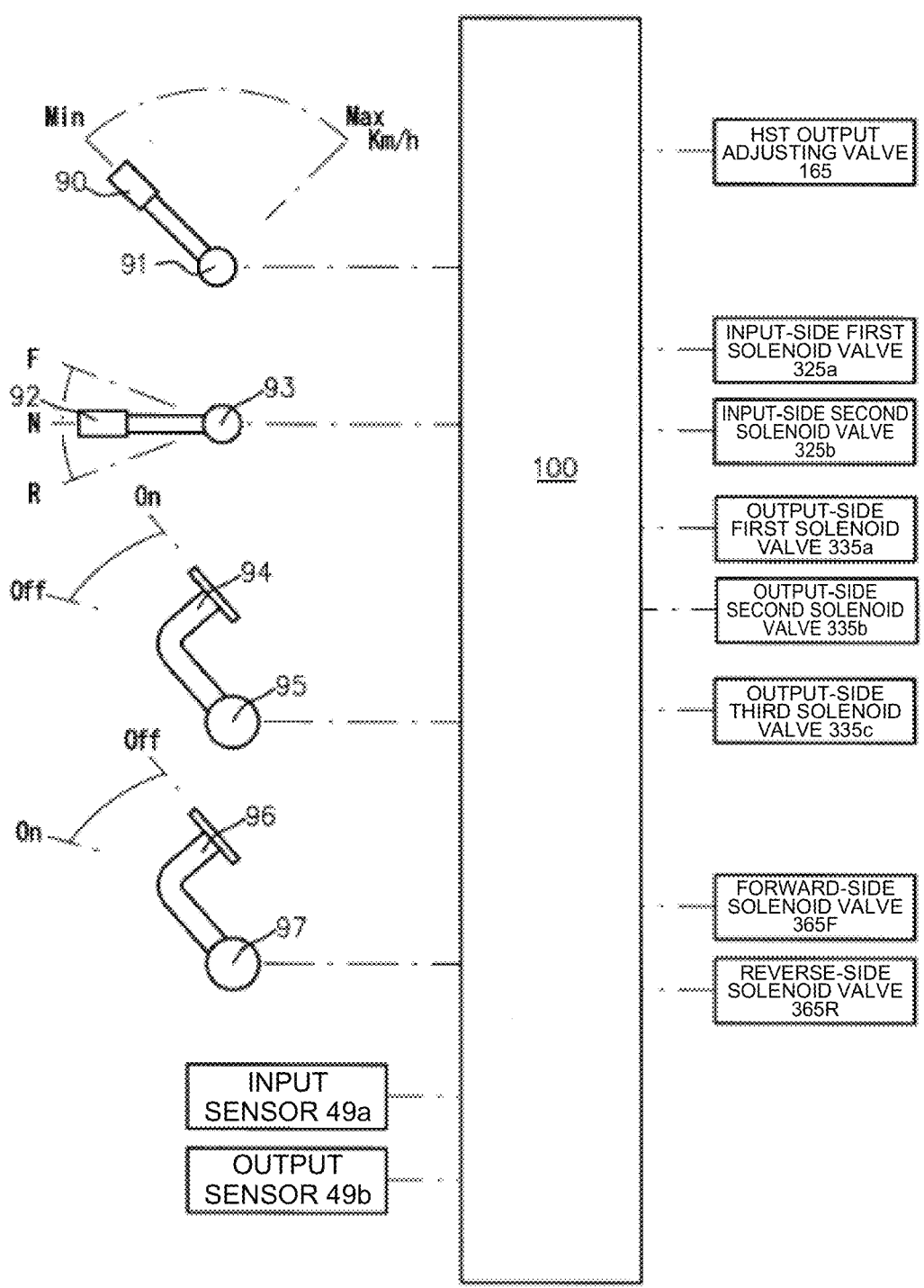
FIG. 4 is a block diagram of a control device in the transmission structure according to the first embodiment.

FIG. 4 is a block diagram of the control device 100.

As illustrated in FIG. 1 and FIG. 4, in the present embodiment, the gear shift operation member includes, in addition to the vehicle speed setting member 90, the forward-reverse switching operation member 92 for performing an operation of switching the output state of the transmission structure 1 among a forward driving state, a reverse driving state, and a neutral state.

The forward-reverse switching operation member 92 can be set to the neutral position N, the forward-traveling position F, and the reverse-traveling position R.

The operating position of the forward-reverse switching operation member 92 is detected by the forward-reverse switching sensor 93.

Note that, although the gear shift operation member has the vehicle speed setting member 90 and the forward-reverse switching operation member 92 that are installed as separate bodies in the present embodiment, instead of this, the gear shift operation member may be formed with a single operation member. In the case where the gear shift operation member is a single operation member, the gear shift operation member can be operated so as to swing to the forward side and the reverse side across the lowest speed position.

That is, upon recognizing that the forward-reverse switching operation member 92 is operated to the forward-traveling position F, the control device 100 operates the forward-reverse switching actuator 350 such that the forward-side clutch mechanism 410F is brought into the engaged state and the reverse-side clutch mechanism 410R is brought into the disengaged state. Further, upon recognizing that the forward-reverse switching operation member 92 is operated to the reverse-traveling position R, the control device 100 operates the forward-reverse switching actuator 350 such that the forward-side clutch mechanism 410F is brought into the disengaged state and the reverse-side clutch mechanism 410R is brought into the engaged state. Further, if the forward-reverse switching operation member 92 is positioned in the neutral position N, the control device 100 operates the forward-reverse switching actuator 350 such that both the forward-side clutch mechanism 410F and the reverse-side clutch mechanism 410R are brought into the disengaged state.

As illustrated in FIG. 2, the transmission structure 1 according to the present embodiment has the forward-reverse switching hydraulic mechanism 352 as the forward-reverse switching actuator 350.

The forward-reverse switching hydraulic mechanism 352 is configured so as to use the oil source (the first hydraulic pump 110) that is common to the charge line 130 of the HST 10, to the hydraulic servo mechanism 152, and to the clutch switching hydraulic mechanism 302.

In detail, as illustrated in FIG. 2, the forward-reverse switching hydraulic mechanism 352 further includes: the clutch line 310; the forward-side supply-drain line 360F and reverse-side supply-drain line 360R with their tip sides fluidly connected to the forward-side clutch mechanism 410F and reverse-side clutch mechanism 410R, respectively; and the forward-side solenoid valve 365F and reverse-side solenoid valve 365R interposed between the clutch line 310 and drain line 340 and the forward-side supply-drain line 360F and the reverse-side supply-drain line 360R, respectively.

The forward-side solenoid valve 365F and the reverse-side solenoid valve 365R are designed to be operatively controlled by the control device 100, so as to be positioned in a supply position that fluidly connects the corresponding supply-drain line 360F or 360R to the clutch line 310, and in a drain position that fluidly connects the corresponding supply-drain line 360F or 360R to the drain line 340.

That is, upon recognizing that the forward-reverse switching operation member 92 is positioned in the forward-traveling position F, the control device 100 causes the forward-side solenoid valve 365F to be positioned in the supply position and the reverse-side solenoid valve 365R to be positioned in the drain position, so as to create the forward driving state in which the forward-side clutch mechanism 410F is in the engaged state and the reverse-side clutch mechanism 410R is in the disengaged state. Further, upon recognizing that the forward-reverse switching operation member 92 is positioned in the reverse-traveling position R, the control device 100 causes the forward-side solenoid valve 365F to be positioned in the drain position and the reverse-side solenoid valve 365R to be positioned in the supply position, so as to create the reverse driving state in which the forward-side clutch mechanism 410F is in the disengaged state and the reverse-side clutch mechanism 410R is in the engaged state. Further, upon recognizing that the forward-reverse switching operation member 92 is positioned in the neutral position N, the control device 100 causes both of the forward-side solenoid valve 365F and the reverse-side solenoid valve 365R to be positioned in the drain position, so as to create the neutral state in which the forward-side clutch mechanism 410F and the reverse-side clutch mechanism 410R are both in the disengaged state.

As illustrated in FIG. 2, in the present embodiment, the forward-side solenoid valve 365F and the reverse-side solenoid valve 365R are solenoid switching valves that instantly increase/decrease the hydraulic pressure of the corresponding forward-side supply-drain line 360F and reverse-side supply-drain line 360R.

As illustrated in FIG. 1 and FIG. 2, the transmission structure 1 according to the present embodiment further includes: the output-side third transmission mechanism 70c which is capable of operatively transmitting the rotational power of the first element to the travel output shaft 47 as a drive rotational power in the forward-traveling direction; and the output-side third clutch mechanism 80c which engages and disengages the power transmission of the output-side third transmission mechanism 70c.

The gear ratio of the output-side third transmission mechanism 70c is set so that the rotation speed of the travel output shaft 47 at the time where the rotational power of the first element is operatively transmitted to the travel output shaft 47 via the output-side third transmission mechanism 70c is higher than the rotation speed of the travel output shaft 47 at the time where the rotational power of the first element is operatively transmitted to the travel output shaft 47 via the output-side second transmission mechanism 70b and the forward-side transmission mechanism 400F.

In the present embodiment, the output-side third transmission mechanism 70c is configured so as to be capable of operatively transmitting the rotational power of the first element to the travel output shaft 47 by using the output-side second following gear 74b of the output-side second transmission mechanism 70b.

In detail, as illustrated in FIG. 1, the output-side third transmission mechanism 70c has the output-side second following gear 74b and the output-side third following gear 74c, which is operatively connected to the output-side second following gear 74b in a state of being supported by the travel output shaft 47 in a manner capable of relative rotation.

The output-side third clutch mechanism 80c is supported by the travel output shaft 47 so as to engage and disengage the output-side third following gear 74c with and from the travel output shaft 47.

In detail, the output-side third clutch mechanism 80c includes: the output-side clutch housing 83 supported by the travel output shaft 47 in a manner not capable of relative rotation; the output-side third friction plate group 84c that includes the third driving-side friction plate supported by the output-side third following gear 74c in a manner not capable relative rotation and the third following-side friction plate supported by the output-side clutch housing 83 in a manner not capable of relative rotation so as to be opposed by the third driving-side friction plate; and an output-side third piston (not illustrated in the drawings) that frictionally engages the output-side third friction plate group 84c.

The output-side third clutch mechanism 80c is designed so as to be switched between engagement and disengagement by the clutch actuator 300.

As described above, the transmission structure 1 has the clutch switching hydraulic mechanism 302 as the clutch actuator 300.

As illustrated in FIG. 2, the clutch switching hydraulic mechanism 302 further includes: the output-side third supply-drain line 330c with its tip side fluidly connected to the output-side third clutch mechanism 80c; and the output-side third solenoid valve 335c interposed between the clutch line 310 and drain line 340 and the output-side third supply-drain line 330c.

The output-side third solenoid valve 335c is designed to be operatively controlled by the control device 100, so as to be positioned in a supply position that fluidly connects the corresponding supply-drain line 330c to the clutch line 310, and in a drain position that fluidly connects the corresponding supply-drain line 330c to the drain line 340.

As illustrated in FIG. 2, in the present embodiment, the output-side third solenoid valve 335c is a solenoid proportional valve capable of adjusting the increasing/decreasing rate of the hydraulic pressure of the corresponding output-side third supply-drain line 330c.

The work vehicle 200 has the left-right pair of main driving wheels as the drive wheel 220.

Accordingly, as illustrated in FIG. 1, the work vehicle 200 further includes: the pair of main driving axles 250 that drive the pair of main driving wheels, respectively; and the differential mechanism 260 that differentially transmits the rotational power of the travel output shaft to the pair of main driving axles 250.

As illustrated in FIG. 1, the work vehicle 200 further includes: the travel brake mechanism 255 that selectively applies a braking force to the main driving axles 250; the differential lock mechanism 265 that forcibly drives the pair of main driving axles 250 in a synchronized manner using a rotational power from the travel output shaft; and the driving force takeout mechanism 270 for subsidiary driving wheels, which is capable of selectively outputting the rotational power taken out from the travel output shaft to the subsidiary driving wheels.

The travel brake mechanism 255 creates a brake-engaged state in response to a brake ON operation of the brake operation member 96 (see FIG. 1 and FIG. 4).

That is, upon recognizing that the brake ON operation is performed with the brake operation member 96, the control device 100 operates a brake actuator (not illustrated in the drawings) so that the travel brake mechanism 255 is brought into the brake-engaged state.

Further, the work vehicle 200 includes: the PTO shaft 280 that outputs a rotational power to the outside; and the PTO clutch mechanism 285 and PTO multistage gear shift mechanism 290 that are interposed in the PTO transmission path extending from the drive source 210 to the PTO shaft 280.

Here, the gear shift control performed by the control device 100 is explained.

First, an explanation is herein given of the gear shift control of the control device 100 in a case where the gear shift operation member is operated from the lowest speed position toward the forward-traveling side to increase the vehicle speed (in the present embodiment, in a case where an acceleration operation is performed on the vehicle speed setting member 90 from the lowest speed position while the forward-reverse switching operation member 92 is positioned in the forward-traveling position F).

Figure 5:
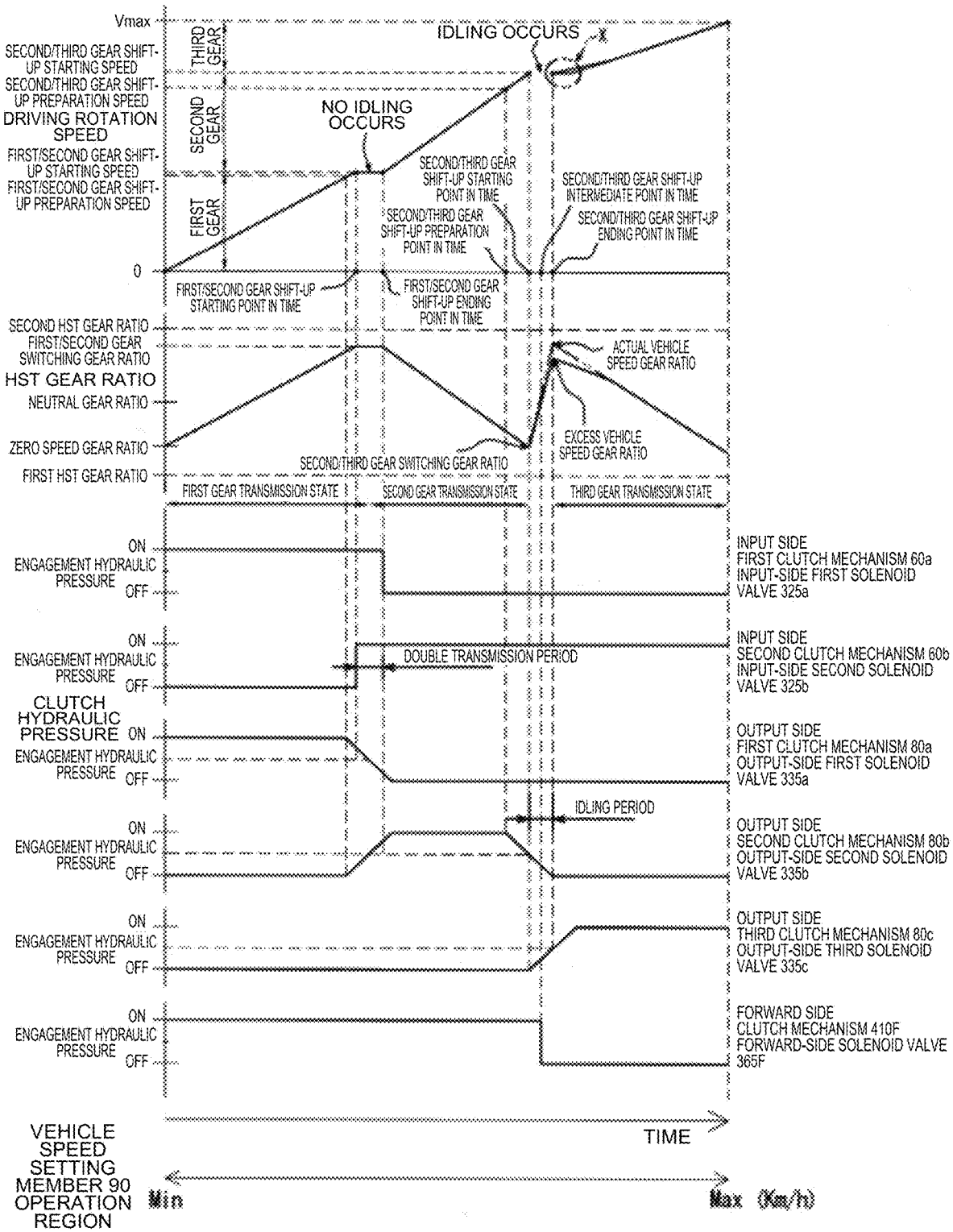
FIG. 5 is a graph illustrating the relationship among the passage of time, the rotation speeds of the drive rotational power of the transmission structure, the rotation speeds of the HST output, and the oil pressures of clutch mechanisms in a case where an acceleration operation is performed on a vehicle speed setting member from the lowest speed position while a forward-reverse switching operation member is positioned in a forward-traveling position in the transmission structure according to the first embodiment.

FIG. 5 is a graph illustrating the relationship among the passage of time, the TM speed ratios (vehicle speeds) of the drive rotational power of the transmission structure 1, the output rotation speeds of the HST 10, and the oil pressures of the clutch mechanisms 60a to 60b, 80a to 80c, and 410F in a case where an acceleration operation is performed on the vehicle speed setting member 90 from the lowest speed position while the forward-reverse switching operation member 92 is positioned in the forward-traveling position F.

In response to the operation of the forward-reverse switching operation member 92 to the forward-traveling position F, the control device 100 operates the forward-reverse switching actuator 350 so as to create the forward-traveling driving state in which the forward-side clutch mechanism 410F is in the engaged state and the reverse-side clutch mechanism 410R is in the disengaged state.

Simultaneously, if the vehicle speed (or the TM speed ratio) is within the first gear range which is from the zero speed (or the zero speed ratio) to a predetermined first/second switching speed (in FIG. 5, the first/second gear shift-up starting speed), the control device 100 operates the clutch actuator 300 so that the input-side first and second clutch mechanisms 60a and 60b are respectively brought into the engaged state and disengaged state, thereby creating the first HMT transmission state in which the first element functions as the reference power input part and the second element functions as the composite power output part which outputs the composite rotational power of the planetary gear mechanism 30 toward the gear shift output shaft 45.

Specifically, as illustrated in FIG. 5, if the vehicle speed is within the first gear range, the control device 100 positions the input-side first solenoid valve 325a in the supply position so that the hydraulic pressure of the input-side first clutch mechanism 60a becomes equal to or greater than the engagement hydraulic pressure (in the present embodiment, the hydraulic pressure that is set using the relief valve 142 (clutch hydraulic pressure ON)), and positions the input-side second solenoid valve 325b in the drain position so that the hydraulic pressure of the input-side second clutch mechanism 60b becomes less than the engagement hydraulic pressure (in the present embodiment, the drain hydraulic pressure (clutch hydraulic pressure OFF)), thereby creating the first HMT transmission state.

Additionally, the control device 100 operates the clutch actuator 300 so that the output-side first and second clutch mechanisms 70a and 70b are respectively brought into the engaged state and disengaged state, thereby creating the second element output state in which the rotational power of the second element is operatively transmitted to the gear shift output shaft 45.

Specifically, as illustrated in FIG. 5, if the vehicle speed is within the first gear range, the control device 100 positions the output-side first solenoid valve 335a in the supply position so that the hydraulic pressure of the output-side first clutch mechanism 80a becomes equal to or greater than the engagement hydraulic pressure (in the present embodiment, the set hydraulic pressure (clutch hydraulic pressure ON)), and positions the output-side second solenoid valve 335b in the drain position so that the hydraulic pressure of the output-side second clutch mechanism 80b becomes less than the engagement hydraulic pressure (in the present embodiment, the drain hydraulic pressure (clutch hydraulic pressure OFF)), thereby creating the second element output state.

That is, the first HMT transmission state and the second element output state are created, and one of the forward-side clutch mechanism 410F and the reverse-side clutch mechanism 410R (in FIG. 5, the forward-side clutch mechanism 410F) is brought into the engaged state, thereby creating the first gear transmission state in which the rotational power is operatively transmitted from the main drive shaft 212 to the travel output shaft 47 at a predetermined low speed gear ratio via the first gear transmission mechanism, which is formed with the input-side first transmission mechanism 50a, the planetary gear mechanism 30, the output-side first transmission mechanism 70a, and one of the forward-side transmission mechanism 400F and the reverse-side transmission mechanism 400R.

Meanwhile, if the vehicle speed is within the second gear range which is from the first/second switching speed to the second/third switching speed (in FIG. 5, the second/third gear shift-up starting speed) that is higher than the first/second switching speed, the control device 100 operates the clutch actuator 300 so that the input-side first and second clutch mechanisms 60a and 60b are respectively brought into the disengaged state and engaged state, thereby creating the second HMT transmission state in which the second element functions as the reference power input part and the first element functions as the composite power output part.

Specifically, as illustrated in FIG. 5, if the vehicle speed is within the second gear range, the control device 100 positions the input-side first solenoid valve 325a in the drain position so that the hydraulic pressure of the input-side first clutch mechanism 60a becomes less than the engagement hydraulic pressure (in the present embodiment, the drain hydraulic pressure (clutch hydraulic pressure OFF)), and positions the input-side second solenoid valve 325b in the supply position so that the hydraulic pressure of the input-side second clutch mechanism 60b becomes equal to or greater than the engagement hydraulic pressure (in the present embodiment, the set hydraulic pressure (clutch hydraulic pressure ON)), thereby creating the second HMT transmission state.

Additionally, the control device 100 operates the clutch actuator 300 so that the output-side first and second clutch mechanisms 80a and 80b are respectively brought into the disengaged state and engaged state, thereby creating the first element output state in which the rotational power of the first element is operatively transmitted to the gear shift output shaft.

Specifically, as illustrated in FIG. 5, if the vehicle speed is within the second gear range, the control device 100 positions the output-side first solenoid valve 335a in the drain position so that the hydraulic pressure of the output-side first clutch mechanism 80a becomes less than the engagement hydraulic pressure (in the present embodiment, the drain hydraulic pressure (clutch hydraulic pressure OFF)), and positions the output-side second solenoid valve 335b in the supply position so that the hydraulic pressure of the output-side second clutch mechanism 80b becomes equal to or greater than the engagement hydraulic pressure (in the present embodiment, the set hydraulic pressure (clutch hydraulic pressure ON)), thereby creating the first element output state.

That is, the second HMT transmission state and the first element output state are created, and one of the forward-side clutch mechanism 410F and the reverse-side clutch mechanism 410R (in FIG. 5, the forward-side clutch mechanism 410F) is brought into the engaged state, thereby creating the second gear transmission state in which the rotational power is transmitted from the main drive shaft 212 to the travel output shaft 47 at a gear ratio higher than that of the first gear transmission mechanism via the second gear transmission mechanism, which is formed with the input-side second transmission mechanism 50b, the planetary gear mechanism 30, the output-side second transmission mechanism 70b, and one of the forward-side transmission mechanism 400F and the reverse-side transmission mechanism 400R.

As illustrated in FIG. 5, the planetary gear mechanism 30 is configured so that, in the first HMT transmission state, the output rotational power of the second element becomes the zero speed if the HST is set to a predetermined zero gear ratio, and, as the HST is shifted from the zero speed gear ratio toward the second HST gear ratio, the composite rotational power output from the second element is accelerated, and meanwhile, in the second HMT transmission state, as the HST is shifted from the second HST gear ratio toward the first HST gear ratio, the composite rotational power output from the first element is accelerated. Note that, in the present embodiment, as illustrated in FIG. 5, the zero speed gear ratio is located on the first HST gear ratio side (the side corresponding to the gear ratio at which the HST output is made reverse) relative to the neutral gear ratio N.

Further, the gear ratio of the input-side first transmission mechanism 50a (the input-side first gear ratio) and the gear ratio of the input-side second transmission mechanism 50b (the input-side second gear ratio) are set so that the rotation speed of the second element at the time where the HST gear ratio is set to a predetermined first/second gear switching gear ratio in the first HMT transmission state is the same as the rotation speed of the second element obtained by the rotational power transmitted via the input-side second transmission mechanism 50b in the second HMT transmission state and so that the rotation speed of the first element at the time where the HST output is set to the first/second gear switching gear ratio in the second HMT transmission state is the same as the rotation speed of the first element obtained by the rotational power transmitted via the input-side first transmission mechanism 50a in the first HMT transmission state.

Note that, in the present embodiment, as illustrated in FIG. 5, the first/second gear switching gear ratio is located on the second HST gear ratio side (the side corresponding to the gear ratio at which the HST output is made forward) relative to the neutral gear ratio N.

In the control device 100, the HST control data for obtaining the HST gear ratios corresponding to the operating positions of the gear shift operation member is stored in advance.

The HST control data includes the first gear to third gear HST control data that are respectively used in the first gear to third gear transmission states.

Note that the HST control data is a concept including numerical value data in which an HST gear ratio corresponding to an operating position of the gear shift operation member is defined and calculation formula data for calculating the HST gear ratio based on the gear shift operating position.

When the vehicle speed is within the first gear range (the first gear transmission state), the control device 100 uses the first gear HST control data to operate the HST actuator 150 (in the present embodiment, the hydraulic servo mechanism 152) so that the HST becomes the zero speed gear ratio or a predetermined creep speed gear ratio in response to the operation of the vehicle speed setting member 90 to the lowest speed position, thereby creating the zero speed of the drive rotational power (that is, the vehicle speed zero speed), and to operate the HST actuator 150 (in the present embodiment, the hydraulic servo mechanism 152) so that, as long as the vehicle speed is within the first gear range, the HST 10 is shifted from the zero speed gear ratio or the predetermined creep speed gear ratio toward the first/second gear switching gear ratio in response to an acceleration operation performed on the vehicle speed setting member 90 from the lowest speed position, thereby accelerating the drive rotational power output from the second element in response to the acceleration operation performed on the vehicle speed setting member 90 within the first gear range.

Note that the control device 100 detects the HST gear ratio, based on the detection signal from the HST sensor. As long as the HST sensor can detect the HST gear ratio at a point in time, various configurations such as a sensor for detecting the operating position of the output adjusting member 20 or the rotation speed of the HST output, can be employed. In the present embodiment, the HST sensor is the rotation speed sensor 19 that detects the rotation speed of the HST output (see FIG. 3).

The control device 100 is configured so that, when the vehicle speed is shifted up from the first gear range to the second gear range in response to an acceleration operation on the vehicle speed setting member 90, the clutch mechanism that is in the disengaged state at the time of the first HMT transmission state (that is, the second clutch mechanism) in one of the clutch mechanism pairs, i.e., the input-side clutch mechanism pair and the output-side clutch mechanism pair, is instantly shifted to the engaged state from the disengaged state at the first/second gear shift-up starting point in time where the vehicle speed reaches a predetermined speed (the first/second gear shift-up starting speed), and the clutch mechanism that is in the engaged state at the time of the first HMT transmission state (that is, the first clutch mechanism) in the one of the clutch mechanism pairs is instantly shifted to the disengaged state from the engaged state at the first/second gear shift-up ending point in time which comes after a predetermined time period elapses from the first/second gear shift-up starting point in time, thereby creating a shift-up double transmission state in which the first and second clutch mechanisms in the one of the clutch mechanism pairs are both engaged in the period from the first/second gear shift-up starting point in time to the first/second gear shift-up ending point in time, and, during the shift-up double transmission state, the first clutch mechanism which is in the engaged state at the time of the first HMT transmission state in the other one of the clutch mechanism pairs, i.e., the input-side clutch mechanism pair and the output-side clutch mechanism pair, is shifted from the engaged state to the disengaged state with the sliding of the friction plate, and the second clutch mechanism which is in the disengaged state at the time of the first HMT transmission state in the other one of the clutch mechanism pairs is shifted from the disengaged state to the engaged state while sliding of the friction plate, thereby switching the engaged state of the first clutch mechanism to the engaged state of the second clutch mechanism in the other one of the clutch mechanism pairs.

According to the above configuration, the shift-up from the first HMT transmission state to the second HMT transmission state can be smoothly performed without causing a power transmission cutoff state.

Furthermore, in the present embodiment, the gear ratio of the output-side first transmission mechanism 70a (the output-side first gear ratio) and the gear ratio of the output-side second transmission mechanism 70b (the output-side second gear ratio) are set so that the rotation speed that is created on the gear shift output shaft 45 when the HST 10 is set to the first/second gear switching gear ratio in the first HMT transmission state is approximately the same as the rotation speed that is created on the gear shift output shaft 45 when the HST 10 is set to the first/second gear switching gear ratio in the second HMT transmission state.

In the present embodiment, as illustrated in FIG. 5, the first/second gear shift-up starting speed is set to the vehicle speed (or the TM speed ratio) that is created when the output of the HST 10 is set to the first/second gear switching gear ratio in the first HMT transmission state.

According to the above configuration, it is possible to effectively prevent or decrease change in vehicle speed at the time of switching between the first and second HMT transmission states.

Note that, as described above, in the present embodiment, the output-side first and second clutch mechanisms 80a and 80b are the friction-plate-type, and thus, even though a slight speed difference occurs in the gear shift output shaft 45 at the time of the switching of transmission states, the friction plate slides, so that the speed difference can be effectively absorbed.

The control device 100 can recognize the vehicle speed through signals from the vehicle speed sensor 49 that detects the rotation speed of the travel output shaft 47 or the gear shift output shaft 45, for example.

In the present embodiment, as illustrated in FIG. 1, the vehicle speed sensor 49 includes: the output sensor 49b for detecting the rotation speed of the travel output shaft 47; and the input sensor 49a for detecting the rotation speed (including the rotational direction) of the driving force input to the transmission structure 1 (in the present embodiment, the driving force input to the input-side first transmission mechanism 50a and the input-side second transmission mechanism 50b).

In the present embodiment, the input-side first and second solenoid valves 325a and 325b, which perform the switching between the supplying and draining of the pressurized oil to and from the input-side first and second clutch mechanisms 60a and 60b that form the input-side clutch mechanism pair, are solenoid switching valves, and the increasing and decreasing of the hydraulic pressures of the input-side first and second clutch mechanisms 60a and 60b are instantly performed.

Meanwhile, the output-side first and second solenoid valves 335a and 335b, which perform the switching between the supplying and draining of the pressurized oil to and from the output-side first and second clutch mechanisms 80a and 80b that form the output-side clutch mechanism pair, are solenoid proportional valves, and the increasing/decreasing rates of the hydraulic pressures of the output-side first and second clutch mechanisms 80a and 80b are adjustable.

In this case, the input-side clutch mechanism pair is the one of the clutch mechanism pairs and the output-side clutch mechanism pair is the other one of the clutch mechanism pairs.

That is, as illustrated in FIG. 5, the control device 100 moves the input-side second solenoid valve 325b from the drain position to the supply position at the first/second gear shift-up starting point in time, so that the input-side second clutch mechanism 60b, which is in the disengaged state in the first HMT transmission state in the input-side clutch mechanism pair, is instantly shifted to the engaged state from the disengaged state, and moves the input-side first solenoid valve 325a from the supply position to the drain position at the first/second gear shift-up ending point in time, so that the input-side first clutch mechanism 60a, which is in the engaged state in the first HMT transmission state in the input-side clutch mechanism pair, is instantly shifted to the disengaged state from the engaged state, thereby creating the shift-up double transmission state in which the input-side first and second clutch mechanisms 60a and 60b in the input-side clutch mechanism pair are both engaged in the period from the first/second gear shift-up starting point in time to the first/second gear shift-up ending point in time.

Furthermore, the control device 100 moves the output-side first solenoid valve 335a, which is a solenoid proportional valve, from the supply position to the drain position, so as to gradually decrease the hydraulic pressure of the output-side first clutch mechanism 80a from the set hydraulic pressure (clutch hydraulic pressure ON) to the drain hydraulic pressure (clutch hydraulic pressure OFF) via the engagement hydraulic pressure, thereby shifting the output-side first clutch mechanism 80a from the engaged state to the disengaged state with the sliding of the friction plate, and moves the output-side second solenoid valve 335b, which is a solenoid proportional valve, from the drain position to the supply position, so as to gradually increase the hydraulic pressure of the output-side second clutch mechanism 80b from the drain hydraulic pressure (clutch hydraulic pressure OFF) to the set hydraulic pressure (clutch hydraulic pressure ON) via the engagement hydraulic pressure, thereby moving the output-side second clutch mechanism 80b from the disengaged state to the engaged state with the sliding of the friction plate, and the switching from the engaged state of the output-side first clutch mechanism 80a to the engaged state of the output-side second clutch mechanism 80b is performed in the shift-up double transmission state.

In the present embodiment, as illustrated in FIG. 5, the movement of the output-side first solenoid valve 335a from the supply position to the drain position and the movement of the output-side second solenoid valve 335b from the drain position to the supply position are performed before the first/second gear shift-up starting point in time.

In detail, the control device 100 moves the output-side first solenoid valve 335a from the supply position to the drain position and moves the output-side second solenoid valve 335b from the drain position to the supply position at the point in time where the vehicle speed reaches the first/second gear shift-up preparation speed, which is lower than the first/second gear shift-up starting speed by a predetermined speed.

In this case, regarding the output-side first and second solenoid valves 335a and 335b which are solenoid proportional valves, the hydraulic pressure increasing/decreasing rates are set so that, during the period from the first/second gear shift-up starting point in time to the first/second gear shift-up ending point in time, the hydraulic pressure of the output-side first clutch mechanism 80a becomes less than the engagement hydraulic pressure from the set hydraulic pressure (clutch hydraulic pressure ON), and the hydraulic pressure of the output-side second clutch mechanism 80b becomes equal to or greater than the engagement hydraulic pressure from the drain hydraulic pressure (clutch hydraulic pressure OFF), and then the hydraulic pressure of the output-side first clutch mechanism 80a reaches the drain hydraulic pressure (clutch hydraulic pressure OFF) and the hydraulic pressure of the output-side second clutch mechanism 80b reaches the set hydraulic pressure (clutch hydraulic pressure ON).

Note that, although, as described above, the movement of the output-side first solenoid valve 335a from the supply position to the drain position and the movement of the output-side second solenoid valve 335b from the drain position to the supply position are performed at the point in time where the first/second gear shift-up preparation speed is reached in the present embodiment, as a matter of course, the present invention is not limited to the above configuration.

That is, the timing of the movement of the output-side first solenoid valve 335a from the supply position to the drain position and the timing of the movement of the output-side second solenoid valve 335b from the drain position to the supply position are appropriately set in accordance with the responsiveness of the corresponding clutch mechanisms 80a and 80b, respectively.

As illustrated in FIG. 5, in a case where the vehicle speed is within the second gear range (the second gear transmission state), the control device 100 uses the second gear HST control data to operate the HST actuator 150 so that the HST 10 is shifted from the second HST gear ratio side to the first HST gear ratio side in accordance with an acceleration operation on the vehicle speed setting member 90, thereby accelerating the drive rotational power (the vehicle speed).

When the vehicle speed is shifted up from the second gear range to the third gear range that is higher than the second gear range in response to an acceleration operation on the vehicle speed setting member 90, the control device 100
  starts shifting one of the output-side second clutch mechanism 80b and the forward-side clutch mechanism 410F (in FIG. 5, the output-side second clutch mechanism 80b) in a sliding manner from the engaged state to the disengaged state at the second/third gear shift-up preparation point in time where the vehicle speed reaches the predetermined second/third gear shift-up preparation speed, so as to shift the one of the output-side second clutch mechanism 80b and the forward-side clutch mechanism 410F to the disengaged state at the second/third shift-up starting point in time which comes after a predetermined time period elapses from the second/third gear shift-up preparation point in time,
  shifts the other one of the output-side second clutch mechanism 80b and the forward-side clutch mechanism 410F (in FIG. 5, the forward-side clutch mechanism 410F) from the engaged state to the disengaged state at the second/third gear shift-up intermediate point in time which comes after a predetermined time period elapses from the second/third gear shift-up starting point in time, and
  shifts the output-side third clutch mechanism 80c from the disengaged state to the engaged state at the second/third gear shift-up ending point in time which comes after a predetermined time period elapses from the second/third gear shift-up intermediate point in time,
  thereby creating a shift-up idling state, in which the power transmission path to the travel output shaft 47 is cut off, during the period from the second/third shift-up starting point in time to the second/third gear shift-up ending point in time.

In the present embodiment, the control device 100 is configured so as to perform the following HST control during the shift-up idling state.

That is, if the HST gear ratio that causes the vehicle speed created via the output-side third transmission mechanism 70c at the second/third gear shift-up ending point in time (the completion point in time of the switching operation to the third gear) to match the actual vehicle speed that is attained immediately before the end of the shift-up is represented as the actual vehicle speed gear ratio, as illustrated in FIG. 5, the control device 100 is configured to calculate an excess vehicle speed gear ratio by adding, to the actual vehicle speed gear ratio, an excess correction value for changing the vehicle speed at the switching operation completion point in time in excess of the actual vehicle speed by a predetermined speed, so as to operate the HST actuator 150 using the excess vehicle speed gear ratio as a control target value during the shift-up idling state.

Note that "changing in excess of the actual vehicle speed by a predetermined speed" means "changing the actual vehicle speed to a higher speed by a predetermined speed" when a low gear (the second gear in this example) is shifted up to a high gear (the third gear in this example), and means "changing the actual vehicle speed to a lower speed by a predetermined speed" when a high gear (the third gear) is shifted down to a low gear (the second gear).

In FIG. 5, how the driving rotation speed (vehicle speed) and the HST gear ratio change in a reference example where the control target value of the HST actuator 150 during the shift-up idling state is set to the actual vehicle speed gear ratio is illustrated with the dashed-two-dotted lines.

As illustrated in the X part of FIG. 5, in the present embodiment in which the excess vehicle speed gear ratio is used as the control target value during the shift-up idling state, the acceleration responsiveness immediately after the end of the second/third gear shift-up (immediately after the completion of the switching operation to the third gear) can be improved, and the traveling feeling can be improved, as compared with the reference example.

Note that the shift shock caused by the difference between the excess vehicle speed gear ratio and the actual vehicle speed gear ratio can be effectively alleviated by sliding the clutch mechanism that will be brought into the engaged state after the gear switch (in the present embodiment, the output-side third clutch mechanism 80*c*) so that the clutch mechanism is gradually shifted to the engaged state.

In the present embodiment, the excess correction value is stored in the control device 100 in advance.

That is, the control device 100 calculates the actual vehicle speed gear ratio that causes the vehicle speed created via the output-side third transmission mechanism 70*c* at the second/third gear shift-up ending point in time (the completion point in time of the switching operation to the third speed) to match the actual vehicle speed that is attained immediately before the end of the shift-up, and calculates the excess vehicle speed gear ratio by adding the excess correction value, which is stored in advance, to the actual vehicle speed gear ratio.

Figure 6:
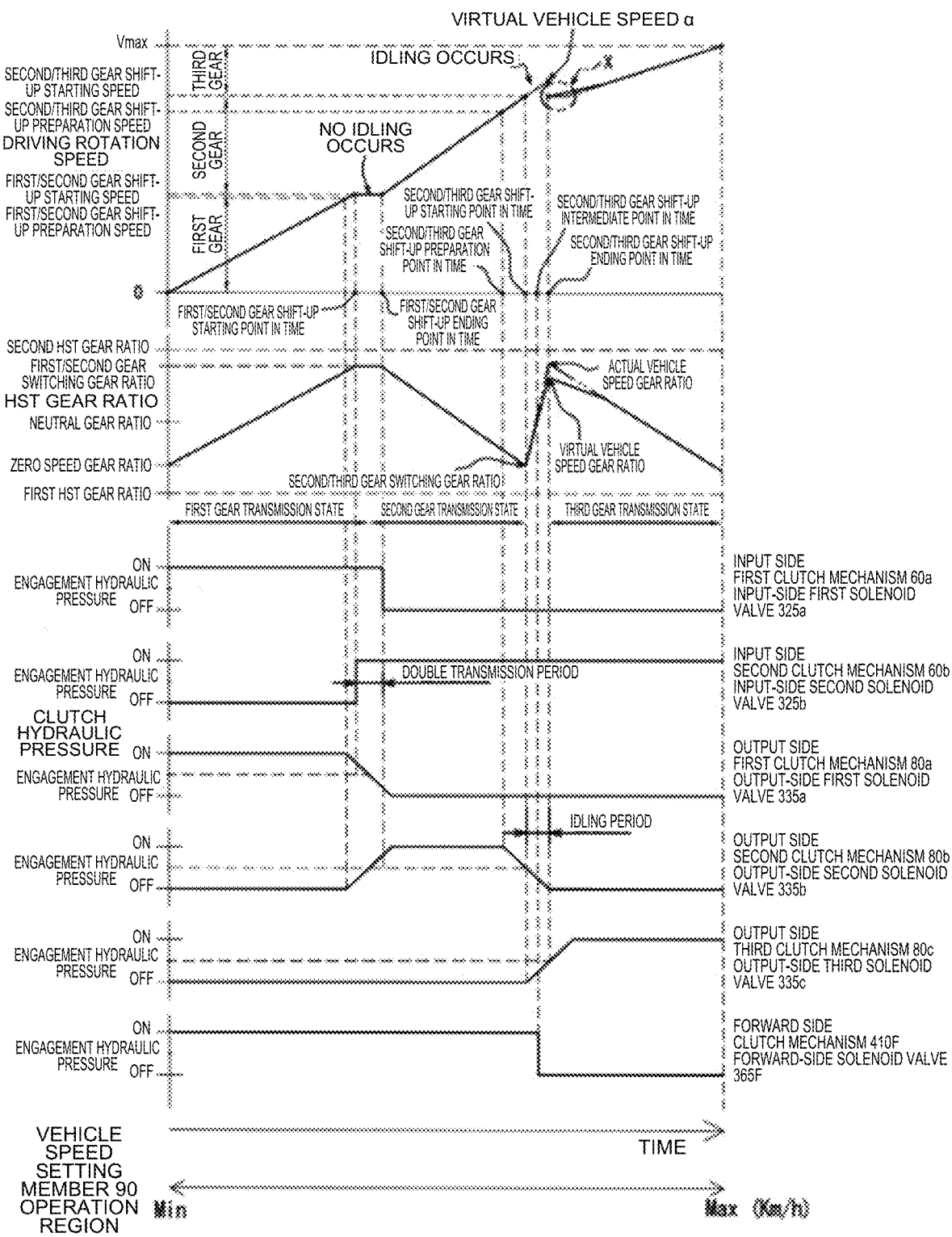
FIG. 6 is a graph illustrating the relationship among the passage of time, the rotation speeds of the drive rotational power of the transmission structure, the rotation speeds of the HST output, and the oil pressures of the clutch mechanisms in a case where an acceleration operation is performed on the vehicle speed setting member from the lowest speed position while the forward-reverse switching operation member is positioned the a forward-traveling position in the transmission structure according to a modification example of the first embodiment.

In FIG. 6, a graph in a modification example of the present embodiment in which the excess vehicle speed gear ratio is calculated by another method is illustrated.

In the modification example illustrated in FIG. 6, based on the HST acceleration rate (that is, the change rate of the HST gear ratio) immediately before the second/third shift-up starting point in time where the shift-up from the second gear (a low gear transmission state) to the third gear (a high gear transmission state) is started and the time period of the idling state, the control device 100 calculates the virtual vehicle speed a at the point in time where the shift-up is completed on the assumption that the transmission state before the shift-up (that is, the second gear) had been continued during the idling state, and uses, as the control target value of the HST actuator 150, the virtual vehicle speed gear ratio that is required to obtain the virtual vehicle speed a.

That is, in the present embodiment illustrated in FIG. 5, the control device 100 uses a predetermined value stored in advance as the excess correction value, whereas in the modification example in FIG. 6, the control device 100 is configured so that the absolute value of the difference between the virtual vehicle speed gear ratio that creates the virtual vehicle speed a and the actual vehicle speed gear ratio is used as the excess correction value.

Note that, in the modification example, the sampling time period for calculating the HST acceleration rate (that is, the change rate of the HST gear ratio) is set in the control device 100 in advance.

Further, the second/third gear shift-up starting speed which defines the second/third shift-up starting point in time is the vehicle speed created by the rotational power that is operatively transmitted from the first element via the output-side second transmission mechanism 70*b* and the forward-side transmission mechanism 400F when the HST 10 is set to the second/third gear switching gear ratio.

In the present embodiment, as described above, the output-side third solenoid valve 335*c* that switches the supplying and draining of the pressurized oil to and from the output-side third clutch mechanism 80*c* is a solenoid proportional valve.

The hydraulic pressure increasing rate of the output-side third solenoid valve 335*c* is set so that, in a predetermined time period from second/third shift-up starting point in time to the second/third gear shift-up ending point in time, the hydraulic pressure of the output-side third clutch mechanism 80*c* is gradually increased from the drain hydraulic pressure (clutch hydraulic pressure OFF) to the engagement hydraulic pressure.

In this case, by moving the output-side third solenoid valve 335*c* from the drain position to the supply position at the second/third shift-up starting point in time, the control device 100 can reliably create the shift-up idling state during the period from the second/third shift-up starting point in time to the second/third gear shift-up ending point in time.

When the vehicle speed is within the third gear range, the control device 100 creates the second HMT transmission state, brings the output-side first and second clutch mechanisms 80*a* and 80*b* into the disengaged state, and brings the output-side third clutch mechanism 80*c* into the engaged state, thereby creating the third gear transmission state in which the rotational power is transmitted from the main drive shaft 212 to the travel output shaft 47 at a gear ratio higher than that of the second gear transmission mechanism via the third gear transmission mechanism, which is formed with the input-side second transmission mechanism 50*b*, the planetary gear mechanism 30, and the output-side third transmission mechanism 70*c*.

When the vehicle speed is within the third gear range (the third gear transmission state), the control device 100 operates the HST actuator 150 using the third gear HST control data so as to create the vehicle speed corresponding to the operation on the vehicle speed setting member 90.

Specifically, as illustrated in FIG. 5, when the vehicle speed is within the third gear range (the third gear transmission state), the control device 100 operates the HST actuator 150 so that the HST 10 shifts from the second HST gear ratio side to the first HST gear ratio side in response to the acceleration operation on the vehicle speed setting member 90.

Note that, when vehicle speed is within the third gear range, there is no need to transmit the power from the gear shift output shaft 45 to the travel output shaft 47, and thus, as illustrated in FIG. 5, the control device 100 brings the forward-side clutch mechanism 410F to the disengaged state.

Next, an explanation is given of the gear shift control of the control device 100 in a case where a deceleration operation is performed with the gear shift operation member.

Figure 7:
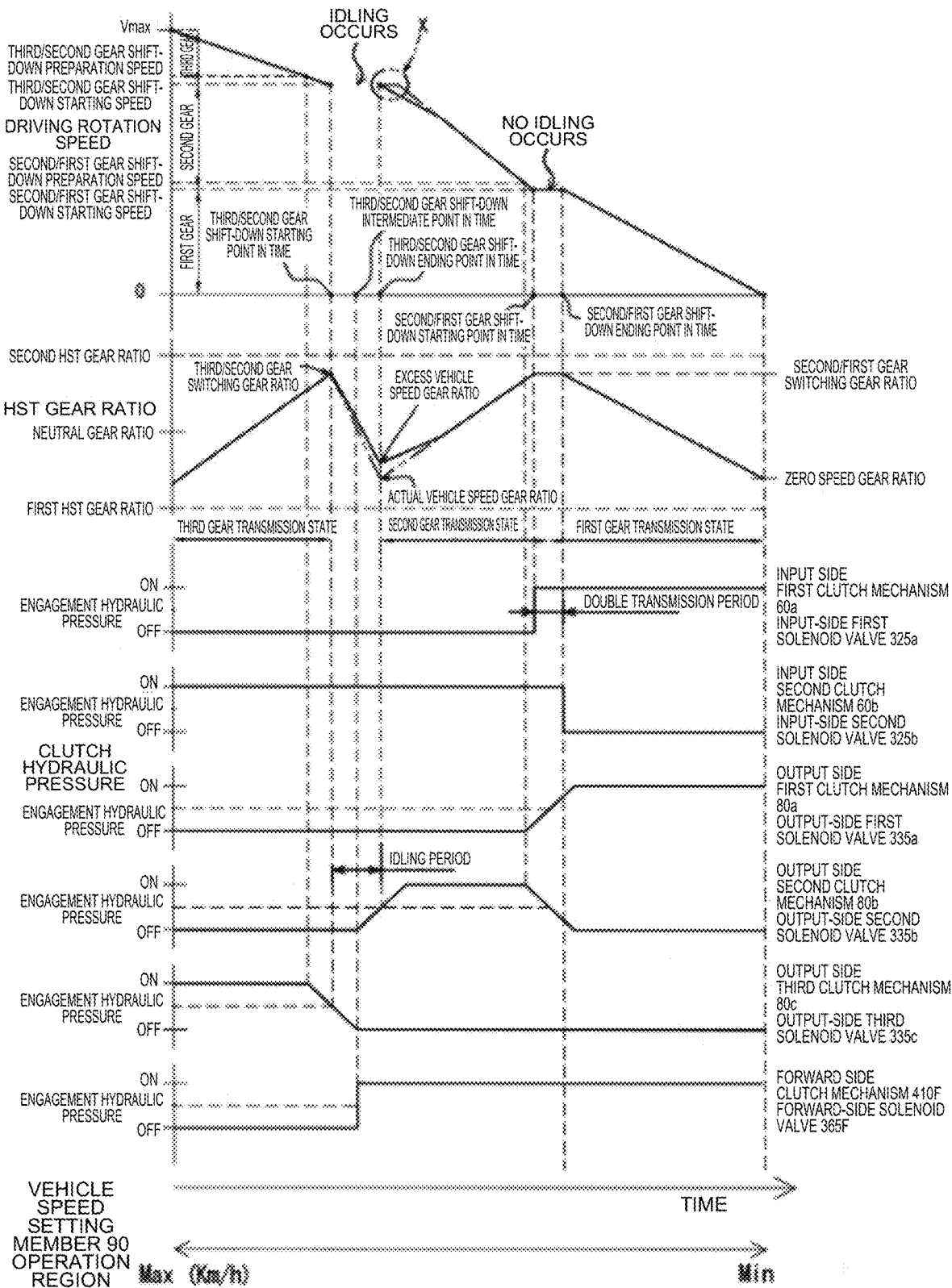
FIG. 7 is a graph illustrating the relationship among the passage of time, the rotation speeds of the drive rotational power of the transmission structure, the rotation speeds of the HST output, and the oil pressures of the clutch mechanisms in a case where the vehicle speed setting member is operated to decrease the speed from a state in which the vehicle speed is within the third gear range while the forward-reverse switching operation member is positioned in the forward-traveling position in the transmission structure according to the first embodiment.

FIG. 7 illustrates a relation among the passage of time, the rotation speed of the drive rotational power of the transmission structure 1, the output rotation speed of the HST 10, and the oil pressures of the clutch mechanisms 60*a* to 60*b*, 80*a* to 80*c*, and 410F in a case where a deceleration operation is performed with the vehicle speed setting member 90 in a state where the forward-reverse switching operation member 92 is positioned in the forward-traveling position F and the vehicle speed is within the third gear range.

As illustrated in FIG. 7, when the vehicle speed is within the third gear range, the control device 100 creates the third gear transmission state, and then operates the HST actuator 150 using the third gear HST control data so that the gear ratio of the HST 10 changes from the first HST gear ratio side to the second HST gear ratio side in accordance with the deceleration operation on the vehicle speed setting member 90, thereby decelerating the rotation speed (vehicle speed) of the drive rotational power in accordance with the deceleration operation on the vehicle speed setting member 90.

When the vehicle speed is shifted down from the third gear range to the second gear range in response to a deceleration operation on the vehicle speed setting member 90, the control device 100 starts shifting the output-side third clutch mechanism 80c in a sliding manner from the engaged state to the disengaged state at the third/second gear shift-down preparation point in time where the vehicle speed reaches a predetermined third/second gear shift-down preparation speed, so that the output-side third clutch mechanism 80c is shifted to the disengaged state at the third/second gear shift-down starting point in time which comes after a predetermined time period elapses from the third/second gear shift-down preparation point in time, shifts the forward-side clutch mechanism 410F from the disengaged state to the engaged state at the third/second shift-down intermediate point in time which comes after a predetermined time period elapses from the third/second gear shift-down starting point in time, and shifts the output-side second clutch mechanism 80b from the disengaged state to the engaged state at the third/second gear shift-down ending point in time which comes after a predetermined time period elapses from the third/second shift-down intermediate point in time, thereby creating a shift-down idling state, in which the power transmission path to the travel output shaft 47 is cut off, during the period from the third/second gear shift-down starting point in time to the third/second gear shift-down ending point in time.

Additionally, as illustrated in FIG. 7, if the HST gear ratio that causes the vehicle speed created via the output-side second transmission mechanism 70b and the forward-side transmission mechanism 400F at the third/second gear shift-down ending point in time (the completion point in time of the switching operation to the second gear) to match the actual vehicle speed that is attained immediately before the end of the shift-down is represented as the actual vehicle speed gear ratio, the control device 100 is configured to calculate an excess vehicle speed gear ratio by adding, to the actual vehicle speed gear ratio, an excess correction value for changing the vehicle speed at the switching operation completion point in time in excess of the actual vehicle speed by a predetermined speed (that is, changing the vehicle speed to a speed lower by a predetermined speed than the actual speed), so as to operate the HST actuator 150 using the excess vehicle speed gear ratio as the control target value during the shift-down idling state.

In FIG. 7, how the driving rotation speed (vehicle speed) and the HST gear ratio change in a reference example where the control target value of the HST actuator 150 during the shift-down idling state is set to the actual vehicle speed gear ratio is illustrated with the dashed-two-dotted lines.

The excess correction value may be stored in the control device 100 in advance or may be calculated by the control device 100 based on a virtual vehicle speed as in the modification example illustrated in FIG. 6. That is, the control device 100 may store numerical data in which the excess correction value is defined in advance or may store calculation formula data for calculating the excess correction value based on a virtual vehicle speed in advance.

Note that the third/second gear shift-down starting speed is set to a vehicle speed that can be created within the variable output range of the HST 10 in a state where the rotational power is operatively transmitted from the first element to the travel output shaft 47 via the output-side second transmission mechanism 70b and the forward-side transmission mechanism 400F (that is, in the second gear transmission state).

As illustrated in FIG. 7, when the vehicle speed is within the second gear range, the control device 100 creates the second gear transmission state, and then operates the HST actuator 150 using the second gear HST control data so that the gear ratio of the HST 10 changes from the first HST gear ratio side to the second HST gear ratio side in accordance with the deceleration operation on the vehicle speed setting member 90, thereby decelerating the vehicle speed in accordance with the deceleration operation of the vehicle speed setting member 90.

The control device 100 is configured so that, when the vehicle speed is shifted down from the second gear range to the first gear range in response to a deceleration operation on the vehicle speed setting member 90, the first clutch mechanism (the input-side first clutch mechanism 60a) in one of the clutch mechanism pairs, i.e., the input-side clutch mechanism pair and the output-side clutch mechanism pair (for example, in the input-side clutch mechanism pair) is instantly shifted from the disengaged state to the engaged state at the second/first gear shift-down starting point in time where the vehicle speed reaches a predetermined speed (the second/first gear shift-down starting speed), and the second clutch mechanism (the input-side second clutch mechanism 60b) in the one of the clutch mechanism pairs (in the input-side clutch mechanism pair) is instantly shifted from the engaged state to the disengaged state at the second/first gear shift-down ending point in time which comes after a predetermined time period elapses from the second/first gear shift-down starting point in time, thereby creating a shift-down double transmission state in which the first and second clutch mechanisms in the one of the clutch mechanism pairs (in the input-side clutch mechanism pair) are both engaged in the period from the second/first gear shift-down starting point in time to the shift-down ending point in time, and, during the shift-down double transmission state, the first clutch mechanism (the output-side first clutch mechanism 80a) in the other one of the input-side clutch mechanism pair and the output-side clutch mechanism pair (in the output-side clutch mechanism pair) is shifted from the disengaged state to the engaged state with the sliding of the friction plate, and the second clutch mechanism (the output-side second clutch mechanism 80b) in the other one of the clutch mechanism pairs is shifted from the engaged state to the disengaged state with the sliding of the friction plate, thereby switching the engaged state of the second clutch mechanism to the engaged state of the first clutch mechanism in the other one of the clutch mechanism pairs (the output-side clutch mechanism pair).

According to the above configuration, the shift-down from the second HMT transmission state to the first HMT transmission state can be smoothly performed without causing a power transmission cutoff state.

In the present embodiment, as illustrated in FIG. 7, the second/first gear shift-down starting speed is set to the vehicle speed that is created when the HST 10 is set to the second/first gear switching gear ratio in the second HMT transmission state.

As described above, in the present embodiment, the output-side first and second solenoid valves 335a and 335b, which switch the supplying and draining of the pressurized oil to and from the output-side first and second clutch mechanisms 80a and 80b which form the output-side clutch mechanism pair, are solenoid proportional valves, and the increasing/decreasing rates of the hydraulic pressures of the output-side first and second clutch mechanisms 80a and 80b are adjustable.

In this case, the input-side clutch mechanism pair is the one of the clutch mechanism pairs and the output-side clutch mechanism pair is the other one of the clutch mechanism pairs.

In the present embodiment, as illustrated in FIG. 7, the control device 100 moves the input-side first solenoid valve 325a from the drain position to the supply position at the second/first gear shift-down starting point in time, so that the input-side first clutch mechanism 60a, which is in the disengaged state in the second HMT transmission state in the input-side clutch mechanism pair, is instantly shifted to the engaged state from the disengaged state, and moves the input-side second solenoid valve 325b from the supply position to the drain position at the second/first gear shift-down ending point in time, so that the input-side second clutch mechanism 60b, which is in the engaged state in the second HMT transmission state in the input-side clutch mechanism pair, is instantly shifted to the disengaged state from the engaged state, thereby creating the shift-down double transmission state in which the input-side first and second clutch mechanisms 60a and 60b in the input-side clutch mechanism pair are both engaged in the period from the second/first gear shift-down starting point in time to the shift-down ending point in time.

Furthermore, the control device 100 moves the output-side second solenoid valve 335b which is a solenoid proportional valve from the supply position to the drain position, so as to gradually decrease the hydraulic pressure of the output-side second clutch mechanism 80b from the set hydraulic pressure (clutch hydraulic pressure ON) to less than the engagement hydraulic pressure (specifically, the drain hydraulic pressure (clutch hydraulic pressure OFF)), thereby shifting the output-side second clutch mechanism 80b from the engaged state to the disengaged state with the sliding of the friction plate, and moves the output-side first solenoid valve 335a which is a solenoid proportional valve from the drain position to the supply position, so as to gradually increase the hydraulic pressure of the output-side first clutch mechanism 80a from the drain hydraulic pressure (clutch hydraulic pressure OFF) to a hydraulic pressure that is equal to or greater than the engagement hydraulic pressure (specifically, the set hydraulic pressure (clutch hydraulic pressure ON)), thereby moving the output-side first clutch mechanism 80a from the disengaged state to the engaged state with the sliding of the friction plate, and thus the switching from the engaged state of the output-side second clutch mechanism 80b to the engaged state of the output-side first clutch mechanism 80a is performed during the shift-down double transmission state.

In the present embodiment, as illustrated in FIG. 7, the movement of the output-side second solenoid valve 335b from the supply position to the drain position and the movement of the output-side first solenoid valve 335a from the drain position to the supply position are performed before the second/first gear shift-down starting point in time.

In detail, the control device 100 is configured to move the output-side second solenoid valve 335b from the supply position to the drain position and move the output-side first solenoid valve 335a from the drain position to the supply position at the point in time where the vehicle speed reaches the second/first gear shift-down preparation speed, which is higher than the second/first gear shift-down starting speed by a predetermined speed.

In this case, regarding the output-side first and second solenoid valves 335a and 335b which are solenoid proportional valves, the hydraulic pressure increasing/decreasing rates are set so that, during the shift-down double transmission state from the second/first gear shift-down starting point in time to the second/first gear shift-down ending point in time, the hydraulic pressure of the output-side first clutch mechanism 80a becomes equal to or greater than the engagement hydraulic pressure from the drain hydraulic pressure (clutch hydraulic pressure OFF), and the hydraulic pressure of the output-side second clutch mechanism 80b becomes less than the engagement hydraulic pressure from the set hydraulic pressure (clutch hydraulic pressure ON), and, after a predetermined time period elapses from the second/first gear shift-down ending point in time, the hydraulic pressure of the output-side first clutch mechanism 80a reaches the set hydraulic pressure (clutch hydraulic pressure ON) and the hydraulic pressure of the output-side second clutch mechanism 80b reaches the drain hydraulic pressure (clutch hydraulic pressure OFF).

Note that, although, as described above, the movement of the output-side second solenoid valve 335b from the supply position to the drain position and the movement of the output-side first solenoid valve 335a from the drain position to the supply position are performed before the second/first gear shift-down starting point in time in the present embodiment, as a matter of course, the present invention is not limited to the above configuration. That is, the timing of the movement of the output-side second solenoid valve 335b from the supply position to the drain position and the timing of the movement of the output-side first solenoid valve 335a from the drain position to the supply position are appropriately set in accordance with the responsiveness of the corresponding clutch mechanisms 80b and 80a, respectively.

Further, as described above, the present embodiment is configured so that the output-side first and second solenoid valves 335a and 335b are solenoid proportional valves, so as to gradually increase and decrease the hydraulic pressures of the first and second clutch mechanisms 80a and 80b, and the input-side first and second solenoid valves 325a and 325b are solenoid switching valves, so as to instantly increase and decrease the hydraulic pressures of the input-side first and second clutch mechanisms 60a and 60b. However, as a matter of course, the present invention is not limited to the above embodiment.

For example, a modification such that the output-side first and second solenoid valves 335a and 335b are configured as solenoid switching valves and the input-side first and second solenoid valves 325a and 325b are configured as solenoid proportional valves is also possible.

When the vehicle speed is within the first gear range, the control device 100 creates the first gear transmission state, and then operates the HST actuator 150 using the first gear HST control data so that the gear ratio of the HST 10 changes from the second HST gear ratio side to the first HST gear ratio side in accordance with a deceleration operation on the vehicle speed setting member 90, thereby decelerating the vehicle speed in accordance with the deceleration operation on the vehicle speed setting member 90.

Preferably, during a predetermined time period from the point in time where a gear change using the excess correction value is completed, the gear ratio obtained by adding the excess correction value to the reference HST gear ratio, which is obtained by applying the operating position of the gear shift operation member to the HST control data, while reducing the excess correction value at a predetermined rate can be set as the control target value of the HST actuator 150.

Second Embodiment

Hereinafter, a transmission structure according to another embodiment of the present invention is explained with reference to the accompanying drawings.

Figure 8:
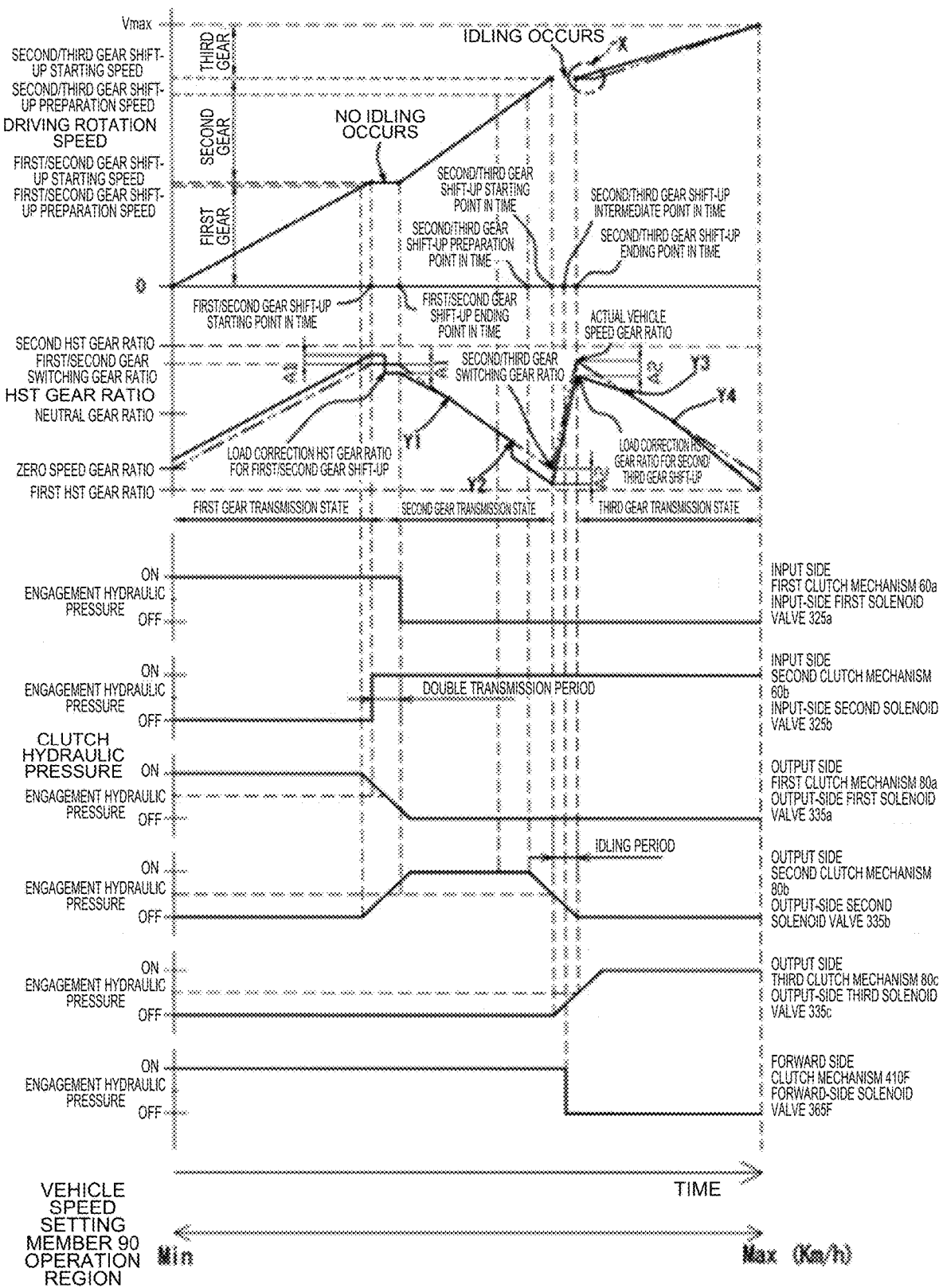
FIG. 8 is a graph illustrating the relationship among the passage of time, the rotation speeds of the drive rotational power of the transmission structure, the rotation speeds of the HST output, and the oil pressures of the clutch mechanisms in a case where an acceleration operation is performed on the vehicle speed setting member from the lowest speed position while the forward-reverse switching operation member is positioned in the forward-traveling position in the transmission structure according to the second embodiment of the present invention.

In the present embodiment, FIG. 8 is a graph illustrating the relationship among the passage of time, the rotation speeds (vehicle speeds) of the drive rotational power of the transmission structure according to the present embodiment, the output rotation speeds of the HST 10, and the oil pressures of the clutch mechanisms 60*a* to 60*b*, 80*a* to 80*c*, and 410F in a case where an acceleration operation is performed on the vehicle speed setting member 90 from the lowest speed position while the forward-reverse switching operation member 92 is positioned in the forward-traveling position F.

Note that, in the figure, the identical signs are given to the identical members of those in the first embodiment.

The transmission structure according to the present embodiment differs from the transmission structure 1 according to the first embodiment in the aspect of the gear shift control for the HST 10 performed by the control device.

In FIG. 8, the solid lines of the HST gear ratio and the driving rotation speed (vehicle speed) indicate the HST gear shift control in the present embodiment, and the dashed-two-dotted lines therein indicate the HST gear shift control in the reference example.

First, an explanation is given of a reference example.

In the reference example indicated with the dashed-two-dotted lines in FIG. 8, when the vehicle speed is within the first gear range, the control device 100 creates the first gear transmission state, and then operates the HST actuator 150 using the reference HST gear ratio, which is obtained by applying the operating position of the gear shift operation member to the first gear HST control data, as the control target value, thereby shifting the HST 10 from the zero speed gear ratio or a predetermined creep speed gear ratio to the first/second gear switching gear ratio in response to an acceleration operation on the gear shift operation member from the lowest speed position.

When the first gear is shifted up to the second gear, the control device 100 operates the clutch actuator 300 so that the first gear transmission state is shifted to the second gear transmission state while maintaining the HST 10 at the first/second gear switching gear ratio.

When the vehicle speed is within the second gear range, the control device 100 creates the second gear transmission state, and then operates the HST actuator 150 using the reference HST gear ratio, which is obtained by applying the operating position of the gear shift operation member to the second gear HST control data, as the control target value, thereby shifting the HST 10 from the first/second gear switching gear ratio to the second/third gear switching gear ratio in response to an acceleration operation on the gear shift operation member.

When the second gear is shifted up to the third gear, the control device 100 creates an idling state, and then during the idling state, operates the HST actuator 150 using, as the control target value, the actual vehicle speed HST gear ratio that causes the vehicle speed to be attained at the shift-up operation completion point in time to match the actual vehicle speed attained immediately before the completion of the shift-up.

When the vehicle speed is within the third gear range, the control device 100 creates the third gear transmission state, and then operates the HST actuator 150 using the reference HST gear ratio, which is obtained by applying the operating position of the gear shift operation member to the third gear HST control data, as the control target value, thereby shifting the HST 10 from the actual vehicle speed gear ratio to the first HST gear ratio side in response to an acceleration operation on the gear shift operation member.

On the other hand, in the present embodiment, the control device 100 is configured to perform the gear shift control of the HST 10 in consideration of the traveling load applied to the travel output shaft 47.

Specifically, the load correction data for obtaining a load correction value corresponding to a traveling load is stored in the control device 100 in advance. The control device 100 is configured to add a load correction value based on the load correction data to the reference HST gear ratio at the time of calculating the control target value of the HST actuator 150. That is, in the configuration, a load correction value is used as the excess correction value.

Note that the load correction data is a concept including numeric value data in which a load correction value corresponding to a traveling load is defined and calculation formula data for calculating the load correction value based on the traveling load.

Note that, for example, the control device 100 can detect the traveling load applied to the travel output shaft 47 based on the magnitude of the difference between the target vehicle speed, which is obtained based on the operating position of the gear shift operation member (the vehicle speed setting member 90), and the actual vehicle speed obtained by the vehicle speed sensor 49.

Hereinafter, the HST gear shift control in the present embodiment is explained with the example of a case in which: in the entire time period of the first gear transmission state, a constant first traveling load is applied; in the second gear transmission state, the traveling load is substantially zero until the Y2 point in time of FIG. 8, and the second traveling load which is greater than the first traveling load is applied in the period from the Y2 point in time to the second/third shift-up starting point in time; and in the third gear transmission state, the traveling load is substantially zero in the period from the second/third gear shift-up ending point in time to the Y4 point in time, and the third traveling load which gradually increases in the period from the Y4 point in time to the maximum vehicle speed Vmax is applied.

Since the first traveling load is applied in the first gear transmission state, the control device 100 calculates a load correction HST gear ratio (the solid line in FIG. 8) by adding a load correction value, which is calculated by applying the first traveling load to the load correction data, to the reference HST gear ratio (the dashed-two-dotted line in FIG. 8), which is calculated by applying the operating position of the gear shift operation member to the corresponding first gear HST control data, and operates the HST actuator using the load correction HST gear ratio as the control target value.

That is, the load correction HST gear ratio (the HST gear ratio indicated with the solid line in the first gear transmission state of FIG. 8) is a gear ratio that causes an excess change in the vehicle speed corresponding to the load correction value (in this case, toward the acceleration side) as compared with the reference HST gear ratio.

When the first gear transmission state is shifted up to the second transmission state, the control device 100 stores the load correction value A1 (see FIG. 8) in the gear switching operation starting point in time (in this case, the first/second gear shift-up starting point in time) as a carry-over load correction value, then calculates the load correction HST gear ratio for the first/second shift-up (see FIG. 8) by adding the absolute value amount of the carry-over load correction value to the reference HST gear ratio of the shift-up completion point in time (in this case, the first/second shift-up ending point in time) in a direction that causes an excess change in the vehicle speed (in this case, the direction that accelerates the vehicle speed), and operates the HST actuator using the load correction HST gear ratio for the first/second shift-up as the control target value.

After the completion of the gear switch (in this case, after the completion of the shift-up from the first gear transmission state to the second gear transmission state), the carry-over load correction value is gradually reduced at a preset reduction rate and is finally set to zero.

That is, in the second gear transmission state, the control device 100 is configured to operate the HST actuator using, as the control target data, an HST gear ratio obtained by adding the carry-over load correction value to a reference HST gear ratio, which is calculated by applying the operating position of the gear shift operation member to the corresponding second gear HST control data, and the added carry-over load correction value is reduced with the passage of time and is set to zero at the Y1 point in time in the example of FIG. 8. Note that, in the present traveling example, as described above, in the second gear transmission state, it is assumed that the traveling load is substantially zero until the Y2 point in time in FIG. 8, and thus the HST gear ratio obtained by adding the carry-over load correction value to the reference HST gear ratio is set as the control target value after the completion of the gear switch (in this case, after the shift-up from the first gear transmission state to the second gear transmission state is completed). However, in a case where a traveling load is applied, the HST gear ratio obtained by adding the carry-over load correction value and a load correction value, which is calculated by applying the traveling load to the load correction data, to the reference HST gear ratio is set as the control target value.

As described above, in the example, the traveling load is substantially zero until the Y2 point in time in the second gear transmission state (see FIG. 8), and thus from the Y1 point in time to the Y2 point in time, the control device 100 operates the HST actuator 150 using the reference HST gear ratio, which is calculated by applying the operating position of the gear shift operation member to the corresponding second gear HST control data, as the control target value.

Since the second traveling load is applied in the period from the Y2 point in time to the second/third shift-up starting point in time, the control device 100 calculates a load correction HST gear ratio by adding a load correction value, which is calculated by applying the second traveling load to load correction data, to the reference HST gear ratio, which is calculated by applying the operating position of the gear shift operation member to the corresponding second gear HST control data, and operates the HST actuator 150 using the load correction HST gear ratio as the control target value.

When the second gear transmission state is shifted up to the third transmission state, the control device 100 stores the load correction value A2 (see FIG. 8) in the gear switching operation starting point in time (in this case, the second/third gear shift-up starting point in time) as the carry-over load correction value, then calculates the load correction HST gear ratio for the second/third shift-up (see FIG. 8) by adding the absolute value amount of the carry-over load correction value to the actual vehicle speed gear ratio that creates the actual vehicle speed attained immediately before the shift-up completion point in time (in this case, the second/third shift-up ending point in time) in a direction that causes an excess change in the vehicle speed (in this case, the direction that accelerates the vehicle speed), and operates the HST actuator 150 using the load correction HST gear ratio for the second/third shift-up as the control target value during the idling state.

The carry-over load correction value at the time of the second/third shift-up is also reduced in accordance with the passage of time at a preset reduction rate, and is finally set to zero (at the Y3 point in time in the example of FIG. 8).

That is, in the third gear transmission state, the control device 100 is configured to operate the HST actuator 150 using, as the control target data, an HST gear ratio obtained by adding the carry-over load correction value to a reference HST gear ratio, which is calculated by applying the operating position of the gear shift operation member to the corresponding third gear HST control data, and the added carry-over load correction value is reduced with the passage of time and is set to zero at the Y3 point in time.

As described above, in the example, the traveling load is substantially zero until the Y4 point in time in the third gear transmission state (see FIG. 8), and thus from the Y3 point in time to the Y4 point in time, the control device 100 operates the HST actuator 150 using the reference HST gear ratio, which is calculated by applying the operating position of the gear shift operation member to the corresponding third gear HST control data, as the control target value.

Since the third traveling load to be gradually increased is applied after the Y4 point in time, the control device 100 calculates the load correction HST gear ratio by adding the load correction value, which is calculated by applying the third traveling load to load correction data, to the reference HST gear ratio, which is calculated by applying the operating position of the gear shift operation member to the corresponding third gear HST control data, and operates the HST actuator 150 using the load correction HST gear ratio as the control target value.

In the present embodiment, as in the first embodiment, it is possible to improve the acceleration responsiveness immediately after a gear switch and to improve the traveling feeling. Note that, as a matter of course, the HST control of the present embodiment can also be applied at the time of shift-down.

Third Embodiment

Hereinafter, a transmission structure according to even another embodiment of the present invention is explained with reference to the accompanying drawings.

Figure 9:
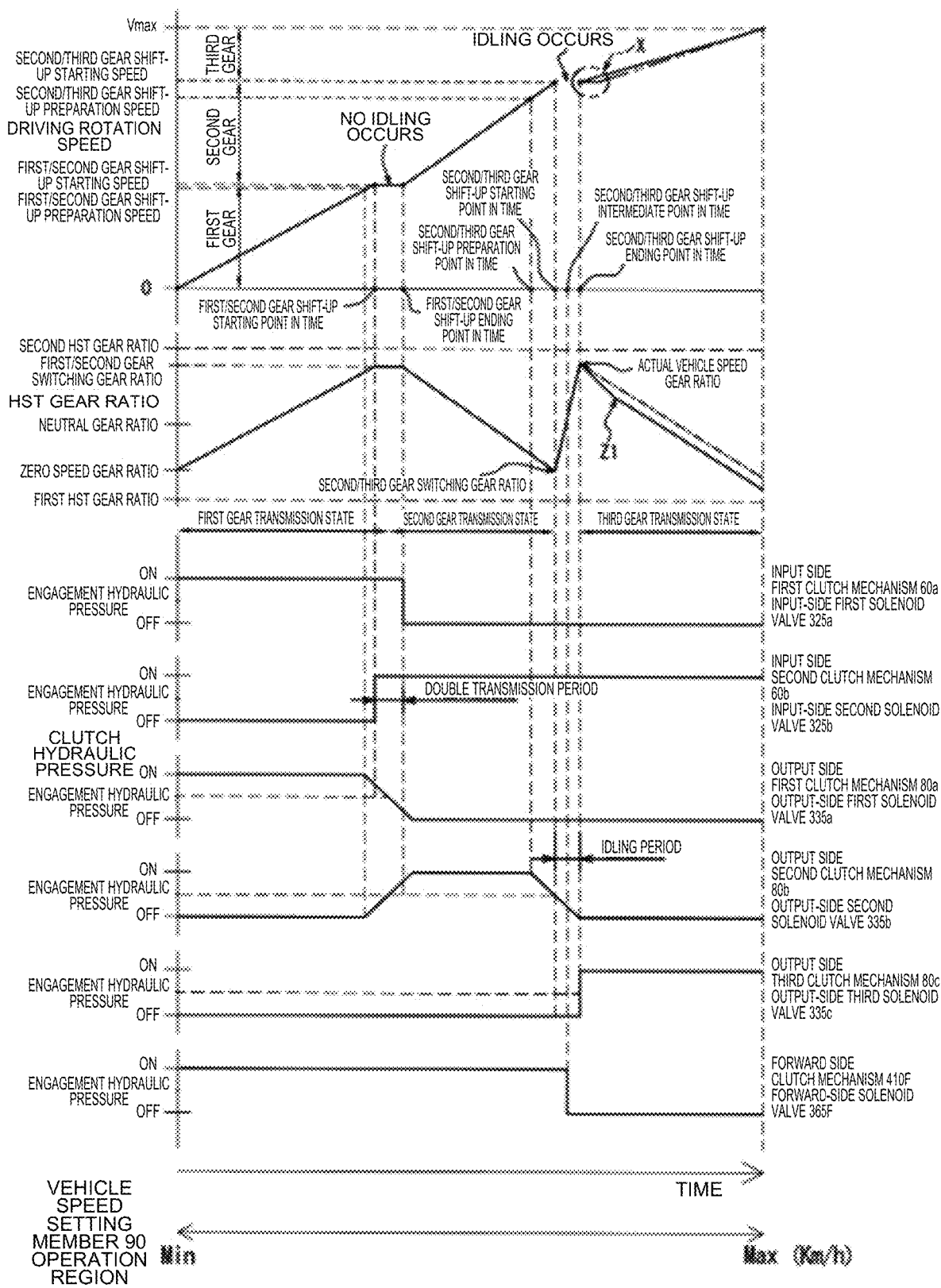
FIG. 9 is a graph illustrating the relationship among the passage of time, the rotation speeds of the drive rotational power of the transmission structure, the rotation speeds of the HST output, and the oil pressures of the clutch mechanisms in a case where an acceleration operation is performed on the vehicle speed setting member from the lowest speed position while the forward-reverse switching operation member is positioned in the forward-traveling position in the transmission structure according to the third embodiment of the present invention.

In the present embodiment, FIG. 9 is a graph illustrating the relationship among the passage of time, the rotation speeds (vehicle speeds) of the drive rotational power of the transmission structure according to the present embodiment, the output rotation speeds of the HST 10, and the oil pressures of the clutch mechanisms 60a to 60b, 80a to 80c, and 410F in a case where an acceleration operation is performed on the vehicle speed setting member 90 from the lowest speed position while the forward-reverse switching operation member 92 is positioned in the forward-traveling position F.

Note that, in the figure, the identical signs are given to the identical members of those in the first and second embodiments.

The transmission structure according to the present embodiment is different from the transmission structure according to the first embodiment in the aspect of the HST control performed by the control device 100 in the transmission states at the time of switching between the second gear transmission state and the third gear transmission state and after the switching between the second gear transmission state and the third gear transmission state.

As illustrated in FIG. 9, in the present embodiment, in the idling state at the time of switching from the second gear transmission state to the third gear transmission state, the control device 100 operates the HST actuator 150 using, as the control target value, the actual vehicle speed gear ratio that causes the vehicle speed to be attained at the switching operation completion point in time (in the present embodiment, the second/third gear shift-up ending point in time) to match the actual vehicle speed attained immediately before the completion of the switching operation.

Furthermore, during a predetermined time period after the completion of the switching operation, the control device 100 is configured to operate the HST actuator 150 using, as the control target value, an excess correction gear ratio obtained by multiplying the reference HST gear ratio, which is obtained by applying the operating position of the gear shift operation member to corresponding third gear HST control data, by a predetermined excess coefficient.

The excess coefficient is a correction value in a direction that causes an excess change in the vehicle speed (in the configuration of FIG. 9, in a direction that accelerates the vehicle speed), and is preset in the control device 100.

In the present embodiment, the predetermined time period in which the multiplication by the excess coefficient is performed (in FIG. 9, the time period from the second/third gear shift-up ending point in time to the Z1 point in time) is preset in the control device 100.

Alternatively, the control device 100 may be configured to change the value of the excess coefficient and/or the predetermined time period in which the multiplication by the excess coefficient is performed in accordance with the traveling load applied to the travel output shaft 47.

Figure 10:
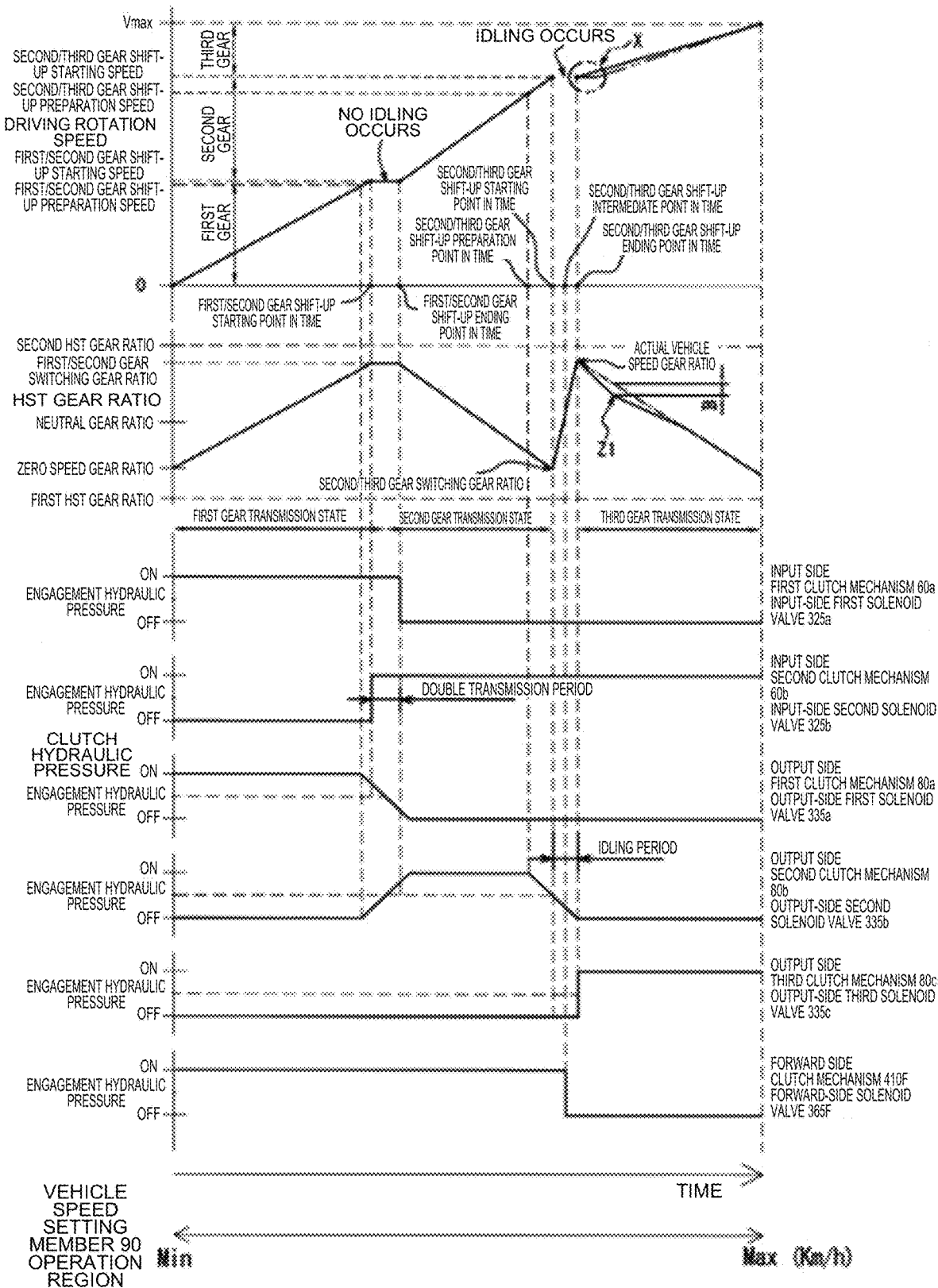
FIG. 10 is a graph illustrating the relationship among the passage of time, the rotation speeds of the drive rotational power of the transmission structure, the rotation speeds of the HST output, and the oil pressures of the clutch mechanisms in a case where an acceleration operation is performed on the vehicle speed setting member from the lowest speed position while the forward-reverse switching operation member is positioned in the forward-traveling position in the transmission structure according to a modification example of the third embodiment.

Furthermore, preferably, as illustrated in FIG. 10, after the predetermined time period ends, the gear ratio obtained by adding the difference B between the excess correction gear ratio and the reference HST gear ratio at the predetermined time period ending point in time (the Z1 point in time) to the reference HST gear ratio while reducing the difference B at a preset predetermined rate can be set as the control target value of the HST actuator 150.

In the present embodiment, as in the first and second embodiments, it is possible to improve the acceleration responsiveness immediately after a gear switch and to improve the traveling feeling.

Note that, as a matter of course, the HST control of the present embodiment can also be applied at the time of shift-down.

Further, the addition of the load correction value according to the traveling load in the second embodiment can also be applied to the first and third embodiments.

In this case, for example, such a configuration in which the excess correction value is added only in a case where a load correction value equal to or greater than a predetermined threshold value is present at the point in time where the gear switching operation is started is also possible.

Note that, in the present embodiment, the HST gear ratio at the gear switching completion point in time is set to the actual vehicle speed gear ratio, and thus the shift shock that may occur in the first and second embodiments is effectively prevented. Therefore, in the present embodiment, as illustrated in FIG. 9, the clutch mechanism that is shifted to the engaged state after a gear switch (in the present embodiment, the output-side third clutch mechanism 80c) can be instantaneously shifted to the engaged state.

REFERENCE SIGNS LIST 1 transmission structure
10 Hydro Static Transmission (HST)
19 rotation speed sensor (HST sensor)
20 output adjusting member
30 planetary gear mechanism
45 gear shift output shaft
47 travel output shaft
49a input sensor (vehicle speed sensor)
49b output sensor (vehicle speed sensor)
50a, 50b input-side first and second transmission mechanisms
60a, 60b input-side first and second clutch mechanisms
70a to 70c output-side first to third transmission mechanisms
80a to 80c output-side first to third clutch mechanisms
90 vehicle speed setting member (gear shift operation member)
91 vehicle speed setting sensor (gear shift sensor)
92 forward-reverse switching operation member (gear shift operation member)
93 forward-reverse switching sensor (gear shift sensor)
100 control device
150 HST actuator
210 drive source
212 main drive shaft
220 drive wheel
300 clutch actuator
400F, 400R forward-side and reverse-side transmission mechanisms
410F, 410R forward-side and reverse-side clutch mechanisms

The invention claimed is:

1. A transmission structure comprising:
a low gear transmission mechanism that is capable of operatively transmitting a rotational power of a drive shaft, which is operatively coupled with a drive source, to a travel output shaft, which is operatively coupled with a drive wheel, at a predetermined low gear ratio;
a high gear transmission mechanism that operatively transmits the rotational power of the drive shaft to the travel output shaft at a high gear ratio for attaining a higher speed than at the low gear ratio;
a low gear clutch mechanism and a high gear clutch mechanism that engage and disengage power transmission of the low gear transmission mechanism and the high gear transmission mechanism, respectively;
a clutch actuator that switches operation states of the low gear clutch mechanism and the high gear clutch mechanism;
a Hydro Static Transmission (HST) that is capable of performing a continuously-variable gear shift of the rotational power in each of a low gear transmission state and a high gear transmission state which are created by the low gear transmission mechanism and the high gear transmission mechanism;
an HST actuator that operates an output adjusting member of the HST;
a gear shift operation member;

a vehicle speed sensor that directly or indirectly detects a vehicle speed;

an HST sensor that directly or indirectly detects an output rotation speed of the HST; and a control device that has HST control data, which is for obtaining an HST gear ratio corresponding to an operating position of the gear shift operation member and includes low gear HST control data used in the low gear transmission state and high gear HST control data used in the high gear transmission state, wherein the control device operates the HST actuator using, as a control target value, a reference HST gear ratio that is obtained by applying the operating position of the gear shift operation member to the low gear HST control data, while operating the clutch actuator so that the low gear transmission state is created when the vehicle speed is within a predetermined low gear range, operates the HST actuator using, as the control target value, a reference HST gear ratio that is obtained by applying an operating position of the gear shift operation member to the high gear HST control data, while operating the clutch actuator so that the high gear transmission state is created when the vehicle speed is within a predetermined high gear range which is higher than the low gear range, operates the clutch actuator so that an idling state in which both of the low gear and high gear clutch mechanisms are in a disengaged state is created in a period from a start to a completion of a switching operation between the low gear transmission state and the high gear transmission state, and calculates an excess vehicle speed gear ratio by adding an excess correction value, which causes the vehicle speed at a point in time where the switching operation is completed to be changed in excess of an actual vehicle speed by a predetermined speed, to an actual vehicle speed gear ratio, which represents an HST gear ratio that causes the vehicle speed at the point in time where the switching operation is completed to match the actual vehicle speed that is attained immediately before the switching operation is completed, so as to operate the HST actuator using the excess vehicle speed gear ratio as the control target value in the idling state.

2. The transmission structure according to claim 1, wherein the control device adds a load correction value corresponding to a traveling load to the reference HST gear ratio at the time of calculating the control target value of the HST actuator and stores the load correction value at the point in time where the gear switching operation is started as a carry-over load correction value, so as to use the carry-over load correction value as the excess correction value.

3. The transmission structure according to claim 2, wherein the control device uses the carry-over load correction value as the excess correction value only in a case where the load correction value at the point in time where the gear switching operation is started exceeds a predetermined value.

4. The transmission structure according to claim 2, wherein, after the gear switching operation is completed, at the time of calculating the control target value of the HST actuator in the transmission state after the gear switching, the control device adds the carry-over load correction value to the reference HST gear ratio while reducing the carry-over load correction value according to the passage of time.

5. The transmission structure according to claim 1, wherein, as the excess correction value, the control device stores in advance a shift-up excess correction value, which is used for a shift-up from the low gear transmission state to the high gear transmission state, and a shift-down excess correction value, which is used for a shift-down from the high gear transmission state to the low gear transmission state.

6. The transmission structure according to claim 1, wherein, at the time of the gear switching between the low gear transmission state and the high gear transmission state, the control device calculates, based on an HST acceleration rate immediately before the switching operation is started and a time period of the idling state, a virtual vehicle speed to be attained at the point in time where the gear switching operation is completed on an assumption that the transmission state before the gear switching had continued during the idling state, and uses, as the excess correction value, an absolute value of a difference between a virtual vehicle speed gear ratio for creating the virtual speed and the actual vehicle speed gear ratio for creating the actual vehicle speed that is attained immediately before the gear switching operation is completed.

7. Transmission structure according to claim 1, wherein, of the low gear and the high gear clutch mechanisms, at least the clutch mechanism to be in an engaged state after the gear switching is a friction-plate-type which includes a driving-side friction plate and a following-side friction plate, and the control device operates the clutch actuator so that, when the clutch mechanism to be in an engaged state after the gear switching is shifted from a disengaged state to the engaged state, the driving-side friction plate and the following-side friction plate frictionally engage with each other in a sliding manner.

8. The transmission structure according to claim 1 comprising:

a planetary gear mechanism including first to third elements, in which the third element functions as an HST input part that inputs an output rotational power from the HST;

an input-side first transmission mechanism that is capable of operatively transmitting the rotational power of the drive source to the first element at an input-side first gear ratio;

an input-side second transmission mechanism that is capable of operatively transmitting the rotational power of the drive source to the second element at an input-side second gear ratio;

friction-plate-type input-side first and second clutch mechanisms that engage and disengage power transmission of the input-side first and second transmission mechanisms, respectively;

a gear shift output shaft;

an output-side first transmission mechanism that is capable of operatively transmitting a rotational power of the second element to the gear shift output shaft at an output-side first gear ratio;

an output-side second transmission mechanism that is capable of operatively transmitting a rotational power of the first element to the gear shift output shaft at an output-side second gear ratio;

friction-plate-type output-side first and second clutch mechanisms that engage and disengage power transmission of the output-side first and second transmission mechanisms, respectively;

a forward-side transmission mechanism and a reverse-side transmission mechanism that operatively transmit a rotational power of the gear shift output shaft to the travel output shaft as a drive rotational power toward a forward-traveling direction and a reverse-traveling direction, respectively;

friction-plate-type forward-side and reverse-side clutch mechanisms that engage and disengage power transmission of the forward-side transmission mechanism and the reverse-side transmission mechanism, respectively;

an output-side third transmission mechanism that is capable of operatively transmitting the rotational power of the first element to the travel output shaft as the drive rotational power in the forward-traveling direction, wherein the gear ratio is set so that a rotation speed of the travel output shaft that is attained when the rotational power of the first element is operatively transmitted to the travel output shaft via the output-side third transmission mechanism is higher than a rotation speed of the travel output shaft that is attained when the rotational power of the first element is operatively transmitted to the travel output shaft via the output-side second transmission mechanism and the forward-side transmission mechanism; and an output-side third clutch mechanism that engages and disengages power transmission of the output-side third transmission mechanism, wherein the clutch actuator switches operation states of the input-side first and second clutch mechanisms, the output-side first to third clutch mechanisms, and the forward-side and reverse-side clutch mechanisms, the HST performs a continuously-variable gear shift according to an operating position of the output adjusting member between a first HST gear ratio, which causes an output of the HST to be a rotational power in one of forward and reverse rotation, and a second HST gear ratio, which causes an output of the HST to be a rotational power in the other one of the forward and reverse rotation, the HST and the planetary gear mechanism are configured so that, in a first HMT transmission state where the input-side first and second clutch mechanisms are respectively in an engaged state and a disengaged state and the first element functions as a reference power input part that inputs a reference rotational power from the drive source and the second element functions as a composite power output part that outputs a composite rotational power toward the gear shift output shaft, the output rotational power of the second element becomes a zero speed when the HST is set to a zero speed gear ratio and the output rotational power of the second element is accelerated as the HST is shifted from the zero speed gear ratio toward the second HST gear ratio, and, in a second HMT transmission state where the input-side first and second clutch mechanisms are respectively in a disengaged state and an engaged state and the second element functions as the reference power input part and the first element functions as the composite power output part, the output rotational power of the first element is accelerated as the HST is shifted from the second HST gear ratio toward the first HST gear ratio, the control device operates the clutch actuator, in a first gear range where the vehicle speed is in a range from the zero speed to a predetermined first/second switching speed, so as to create the first HMT transmission state and then create a first gear transmission state in which the output-side first and second clutch mechanisms are respectively brought into an engaged state and a disengaged state and the forward-side clutch mechanism is brought into an engaged state, thereby operatively transmitting the rotational power of the second element to the travel output shaft via the gear shift output shaft, operates the clutch actuator, in a second gear range where the vehicle speed is in a range from the first/second switching speed to a second/third switching speed which is higher than the first/second switching speed, so as to create the second HMT transmission state and then create a second gear transmission state in which the output-side first and second clutch mechanisms are respectively brought into a disengaged state and an engaged state and the forward-side clutch mechanism is brought into an engaged state, thereby operatively transmitting the rotational power of the first element to the travel output shaft via the gear shift output shaft, operates the clutch actuator, in a third gear range where the vehicle speed is higher than the second/third switching speed, so as to create the second HMT transmission state and then create a third gear transmission state in which the output-side first and second clutch mechanisms are brought into a disengaged state and the output-side third clutch mechanism is brought into an engaged state, thereby operatively transmitting the rotational power of the first element to the travel output shaft without via the gear shift output shaft, operates the HST actuator, when the vehicle speed is within the first gear range, so that the HST is set to the zero speed gear ratio or a predetermined creep speed gear ratio in response to an operation on the gear shift operation member to a lowest speed position and the HST is shifted toward the second HST gear ratio in response to an acceleration operation on the gear shift operation member, operates the HST actuator, when the vehicle speed is within the second gear range, so that the HST is shifted toward the first HST gear ratio in response to an acceleration operation on the gear shift operation member, and operates the HST actuator, when the vehicle speed is within the third gear range, so that the HST is shifted toward the first HST gear ratio in response to an acceleration operation on the gear shift operation member, a transmission mechanism that creates the second gear transmission state is the low gear transmission mechanism, and a transmission mechanism that creates the third gear transmission state is the high gear transmission mechanism.

9. The transmission structure according to claim 8, wherein the input-side first and second gear ratios are set so that a rotation speed of the second element that is attained when the HST is set to a first/second gear switching gear ratio in the first HMT transmission state is the same as a rotation speed of the second element caused by the rotational power transmitted via the input-side second transmission mechanism in the second HMT transmission state, and so that a rotation speed of the first element that is attained when the HST is set to the first/second gear switching gear ratio in the second HMT transmission state is substantially the same as a rotation speed of the first element caused by the rotational power transmitted via the input-side first transmission mechanism in the first HMT transmission state, and the output-side first and second gear ratios are set so that a rotation speed created in the gear shift output shaft when the output of the HST is set to the first/second gear switching gear ratio in the first HMT transmission state is substantially the same as a rotation speed created in the gear shift output shaft when the HST is set to the first/second gear switching gear ratio in the second HMT transmission state.

10. A transmission structure comprising:

a low gear transmission mechanism that is capable of operatively transmitting a rotational power of a drive shaft, which is operatively coupled with a drive source, to a travel output shaft, which is operatively coupled with a drive wheel, at a predetermined low gear ratio;

a high gear transmission mechanism that operatively transmits the rotational power of the drive shaft to the travel output shaft at a high gear ratio for attaining a higher speed than at the low gear ratio;

a low gear clutch mechanism and a high gear clutch mechanism that engage and disengage power transmission of the low gear transmission mechanism and the high gear transmission mechanism, respectively;

a clutch actuator that switches operation states of the low gear clutch mechanism and the high gear clutch mechanism;

a Hydro Static Transmission (HST) that is capable of performing a continuously-variable gear shift of the rotational power in each of a low gear transmission state and a high gear transmission state which are created by the low gear transmission mechanism and the high gear transmission mechanism;

an HST actuator that operates an output adjusting member of the HST;

a gear shift operation member;

a vehicle speed sensor that directly or indirectly detects a vehicle speed;

an HST sensor that directly or indirectly detects an output rotation speed of the HST; and a control device that has HST control data, which is for obtaining a gear ratio of the HST corresponding to an operating position of the gear shift operation member and includes low gear HST control data used in the low gear transmission state and high gear HST control data used in the high gear transmission state, wherein the control device operates the HST actuator using, as a control target value, a reference HST gear ratio that is obtained by applying the operating position of the gear shift operation member to the low gear HST control data, while operating the clutch actuator so that the low gear transmission state is created when the vehicle speed is within a predetermined low gear range, operates the HST actuator using, as the control target value, a reference HST gear ratio that is obtained by applying an operating position of the gear shift operation member to the high gear HST control data, while operating the clutch actuator so that the high gear transmission state is created when the vehicle speed is within a predetermined high gear range which is higher than the low gear range, operates the clutch actuator so that an idling state in which both of the low gear and high gear clutch mechanisms are in a disengaged state is created in a period from a start to a completion of a switching operation between the low gear transmission state and the high gear transmission state, operates the HST actuator so that an actual vehicle speed gear ratio, which causes the vehicle speed at the point in time where the switching operation is completed to match an actual vehicle speed that is attained immediately before the switching operation is completed, is set to the HST in the idling state, and uses an excess correction gear ratio, which is obtained by multiplying the reference HST gear ratio by a predetermined excess coefficient, as the control target value of the HST actuator in a predetermined time period from the point in time where the switching operation is completed.

11. The transmission structure according to claim 10, wherein, in a case where a traveling load applied to the travel output shaft exceeds a predetermined value in the low gear transmission state and the high gear transmission state, the control device adds a load correction value corresponding to the traveling load applied to the travel output shaft at the time of calculating the control target value of the HST actuator.

12. The transmission structure according to claim 10, wherein, according to the traveling load applied to the travel output shaft, the control device changes a value of the excess coefficient and/or a predetermined time period in which the excess correction gear ratio is used.

13. The transmission structure according to claim 10, wherein, after an end of the predetermined time period from the point in time where the switching operation is completed, the control device uses, as the control target value of the HST actuator, a gear ratio that is obtained by adding a difference between the excess correction gear ratio and the reference HST gear ratio at the point in time where the predetermined time period ends to the reference HST gear ratio while reducing the difference at a predetermined rate that is set in advance.

14. A transmission structure comprising:

a low gear transmission mechanism that is capable of operatively transmitting a rotational power of a drive shaft, which is operatively coupled with a drive source, to a travel output shaft, which is operatively coupled with a drive wheel, at a predetermined low gear ratio;

a high gear transmission mechanism that operatively transmits the rotational power of the drive shaft to the travel output shaft at a high gear ratio for attaining a higher speed than at the low gear ratio;

a low gear clutch mechanism and a high gear clutch mechanism that engage and disengage power transmission of the low gear transmission mechanism and the high gear transmission mechanism, respectively;

a clutch actuator that switches operation states of the low gear clutch mechanism and the high gear clutch mechanism;

a Hydro Static Transmission (HST) that is capable of performing a continuously-variable gear shift of the rotational power in each of a low gear transmission state and a high gear transmission state which are created by the low gear transmission mechanism and the high gear transmission mechanism;

an HST actuator that operates an output adjusting member of the HST;
a gear shift operation member;
a vehicle speed sensor that directly or indirectly detects a vehicle speed;
an HST sensor that directly or indirectly detects an output rotation speed of the HST; and
a control device that has HST control data, which is for obtaining a gear ratio of the HST corresponding to an operating position of the gear shift operation member and includes low gear HST control data used in the low gear transmission state where the low gear clutch mechanism is in an engaged state and high gear HST control data used in the high gear transmission state where the high gear clutch mechanism is in an engaged state,
wherein the control device
operates the HST actuator using, as a control target value, a reference HST gear ratio that is obtained by applying the operating position of the gear shift operation member to the low gear HST control data, while operating the clutch actuator so that the low gear transmission state is created when the vehicle speed is within a predetermined low gear range,
operates the HST actuator using, as the control target value, a reference HST gear ratio that is obtained by applying an operating position of the gear shift operation member to the high gear HST control data, while operating the clutch actuator so that the high gear transmission state is created when the vehicle speed is within a predetermined high gear range which is higher than the low gear range,
adds, to the reference HST gear ratio, a load correction value corresponding to a traveling load applied to the travel output shaft at the time of calculating the control target value of the HST actuator in a case where the traveling load applied to the travel output shaft exceeds a predetermined value in the low gear transmission state and the high gear transmission state,
operates the clutch actuator so that an idling state in which both of the low gear and high gear clutch mechanisms are in a disengaged state is created in a period from a start to a completion of a switching operation between the low gear transmission state and the high gear transmission state,
operates the HST actuator so that an actual vehicle speed gear ratio, which causes the vehicle speed at the point in time where the switching operation is completed to match an actual vehicle speed that is attained immediately before the switching operation is completed, is set to the HST in the idling state, and
uses an excess correction gear ratio, which is obtained by multiplying the reference HST gear ratio by a predetermined excess coefficient, as the control target value of the HST actuator in a predetermined time period from the point in time where the switching operation is completed in a case where the load correction value is present at the point in time where the gear switching operation is started.

15. A transmission structure comprising:
a Hydro Static Transmission (HST) that is capable of performing a continuously-variable gear shift between a first HST gear ratio, at which a rotational power operatively input from a drive source is output as a rotational power in one of forward and reverse rotation, and a second HST gear ratio, at which the rotational power is output as a rotational power in the other one of the forward and reverse rotation, in accordance with an operating position of an output adjusting member;
an HST actuator that operates the output adjusting member of the HST;
a gear shift operation member;
a planetary gear mechanism including first to third elements, in which the third element functions as an HST input part that inputs the rotational power output from the HST;
an input-side first transmission mechanism that is capable of operatively transmitting the rotational power of the drive source to the first element at an input-side first gear ratio;
an input-side second transmission mechanism that is capable of operatively transmitting the rotational power of the drive source to the second element at an input-side second gear ratio;
friction-plate-type input-side first and second clutch mechanisms that engage and disengage power transmission of the input-side first and second transmission mechanisms, respectively;
a gear shift output shaft;
an output-side first transmission mechanism that is capable of operatively transmitting a rotational power of the second element to the gear shift output shaft at an output-side first gear ratio;
an output-side second transmission mechanism that is capable of operatively transmitting a rotational power of the first element to the gear shift output shaft at an output-side second gear ratio;
friction-plate-type output-side first and second clutch mechanisms that engage and disengage power transmission of the output-side first and second transmission mechanisms,
respectively;
a clutch actuator that switches operation states of the clutch mechanisms;
a vehicle speed sensor that directly or indirectly detects a vehicle speed;
an HST sensor that directly or indirectly detects an output rotation speed of the HST; and
a control device that performs operation control of the HST actuator and the clutch actuator,
wherein the HST and the planetary gear mechanism are configured so that, in a first HMT transmission state where the input-side first and second clutch mechanisms are respectively in an engaged state and a disengaged state and the first element functions as a reference power input part that inputs a reference rotational power from the drive source and the second element functions as a composite power output part that outputs a composite rotational power toward the gear shift output shaft, an output rotational power of the second element becomes a zero speed when the HST is set to a zero speed gear ratio and the output rotational power of the second element is accelerated as the HST is shifted from the zero speed gear ratio toward the second HST gear ratio, and, in a second HMT transmission state where the input-side first and second clutch mechanisms are respectively in a disengaged state and an engaged state and the second element functions as the reference power input part and the first element functions as the composite power output part, an output rotational power of the first element is accelerated as the HST is shifted from the second HST gear ratio toward the first HST gear ratio, the input-side first and second gear ratios are set so that a rotation speed of the second element that is attained when the HST is set to a first/second gear switching gear ratio in the first HMT transmission state is the same as a rotation speed of the second element caused by the rotational power transmitted via the input-side second transmission mechanism in the second HMT transmission state, and so that a rotation speed of the first element that is attained when the HST is set to the first/second gear switching gear ratio in the second HMT transmission state is substantially the same as a rotation speed of the first element caused by the rotational power transmitted via the input-side first transmission mechanism in the first HMT transmission state, the output-side first and second gear ratios are set so that a rotation speed created in the gear shift output shaft when the HST is set to the first/second gear switching gear ratio in the first HMT transmission state is substantially the same as a rotation speed created in the gear shift output shaft when the HST is set to the first/second gear switching gear ratio in the second HMT transmission state, the control device stores HST control data, which is for obtaining a reference HST gear ratio of the HST corresponding to an operating position of the gear shift operation member and includes first gear HST control data used in the first HMT transmission state and second gear HST control data used in the second HMT transmission state, and stores a load correction data, which is for obtaining a load correction value to be added to the reference HST gear ratio in accordance with a traveling load applied to the gear shift output shaft, and the control device
 operates the clutch actuator, in a first gear range where the vehicle speed is in a range from the zero speed to a predetermined first/second switching speed, so as to create the first HMT transmission state and then create a first gear transmission state in which the output-side first and second clutch mechanisms are respectively brought into an engaged state and a disengaged state, thereby operatively transmitting the rotational power of the second element to the gear shift output shaft, operates the clutch actuator, in a second gear range where the vehicle speed is higher than the first/second switching speed, so as to create the second HMT transmission state and then create a second gear transmission state in which the output-side first and second clutch mechanisms are respectively brought into a disengaged state and an engaged state, thereby operatively transmitting the rotational power of the first element to the gear shift output shaft, operates the HST actuator, when the vehicle speed is within the first gear range, using, as a control target value, a reference HST gear ratio obtained by applying the operating position of the gear shift operation member to the first gear HST control data, so that the HST is set to the zero speed gear ratio or a predetermined creep speed gear ratio in response to an operation on the gear shift operation member to a lowest speed position and the HST is shifted toward the second HST gear ratio in response to an acceleration operation on the gear shift operation member, operates the HST actuator, when the vehicle speed is within the second gear range, using, as the control target value, a reference HST gear ratio obtained by applying the operating position of the gear shift operation member to the second gear HST control data, so that the HST is shifted toward the first HST gear ratio in response to an acceleration operation on the gear shift operation member, operates the HST actuator, in a case where the traveling load applied to the gear shift output shaft exceeds a predetermined value, using, as the control target value, a load correction HST gear ratio obtained by adding the load correction value, which is obtained by applying the traveling load to the load correction data, to the reference HST gear ratio, and calculates the load correction HST gear ratio, in a case where the control target value of the HST actuator includes the load correction value at the point in time where switching of the first gear transmission state and the second gear transmission state is started, by adding, in a direction that causes an excess change in the vehicle speed, an absolute value of the load correction value to the reference HST gear ratio, which is obtained by applying the operating position of the gear shift operation member to the HST control data, so as to operate the HST actuator using the load correction HST gear ratio as the control target value at the point in time where the switching is completed.

* * * * *